US012719909B2

(12) United States Patent
Boyer et al.

(10) Patent No.: US 12,719,909 B2
(45) Date of Patent: Aug. 25, 2026

(54) AUTOMATED VULNERABILITY AND THREAT LANDSCAPE ANALYSIS

(71) Applicant: Darktrace Holdings Limited, Cambridge (GB)

(72) Inventors: John Anthony Boyer, Cambridge (GB); Jake Lal, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 242 days.

(21) Appl. No.: 18/117,342

(22) Filed: Mar. 3, 2023

(65) Prior Publication Data

US 2023/0283629 A1 Sep. 7, 2023

Related U.S. Application Data

(60) Provisional application No. 63/447,537, filed on Feb. 22, 2023, provisional application No. 63/317,157, filed on Mar. 7, 2022.

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01); *H04L 63/1416* (2013.01)

(58) Field of Classification Search
CPC . H04L 63/1433; H04L 41/16; H04L 63/1416; H04L 63/1408; H04L 63/1425; H04L 63/1441; H04L 63/145
(Continued)

(56) References Cited

U.S. PATENT DOCUMENTS 9,270,662 B1 * 2/2016 Roth .................. H04L 63/1441
10,268,821 B2 4/2019 Stockdale
(Continued)

FOREIGN PATENT DOCUMENTS

WO WO-2015047435 A1 * 4/2015 .......... G06F 21/554
WO WO-2016081346 A1 * 5/2016 ............ G06N 20/00

OTHER PUBLICATIONS

Gibson, "Chapter 6: Acquisition and Preparation of Data for OSINT Investigations", Open Source Intelligence Investigation: From Strategy to Implementation, 2016, retrieved on [Dec. 8, 2023]. Retrieved from the internet <URL: http//ndi.ethernet.edu.et/bitstream/123456789/58939/1/Babak%20Akhgar.pdf#page=76>entire document.
(Continued)

*Primary Examiner* — Bryan F Wright
(74) *Attorney, Agent, or Firm* — Rutan and Tucker, LLP

(57) ABSTRACT

An open-source intelligence (OSINT) monitoring engine operating as an AI-driven system for monitoring incoming content received from an OSINT source to detect emerging cyber threats is described. The OSINT monitoring engine features a source evaluation module, a content processing engine, and a content classification engine. The source evaluation module determines a confidence level associated with a source of the incoming content and refrains from providing textual information associated with the incoming content unless the confidence level associated with the source is equal to or exceeds a prescribed threshold. The content processing engine identifies salient information from the textual information for use in identifying an emerging cyber threat. The content classification module classifies the salient information to identify characteristics associated with the emerging cyber threat for subsequent adjustment of security controls and/or network resources to mitigate the risks associated with the emerging cyber threat.

20 Claims, 9 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 10,380,613 | B1 * | 8/2019 | Liu | G06Q 30/0202 |
| 10,419,466 | B2 | 9/2019 | Ferguson | |
| 10,701,093 | B2 | 6/2020 | Dean | |
| 2007/0226796 | A1 * | 9/2007 | Gilbert | G06F 21/577 726/25 |
| 2014/0289261 | A1 * | 9/2014 | Shivakumar | G06Q 10/101 707/748 |
| 2018/0330083 | A1 * | 11/2018 | Abbaszadeh | G06N 5/04 |
| 2018/0367561 | A1 * | 12/2018 | Givental | G06N 20/00 |
| 2019/0087910 | A1 * | 3/2019 | Peak | G06Q 40/08 |
| 2019/0260782 | A1 | 8/2019 | Humphrey et al. | |
| 2020/0036743 | A1 * | 1/2020 | Almukaynizi | G06N 3/044 |
| 2020/0244673 | A1 | 7/2020 | Stockdale | |
| 2021/0273958 | A1 | 9/2021 | McLean | |
| 2022/0070194 | A1 | 3/2022 | Pon et al. | |
| 2022/0070202 | A1 * | 3/2022 | Busany | H04L 63/1425 |

OTHER PUBLICATIONS

Ellis, "Using Social Media OSINT to Determine Actor Locations", PhishLabs, Jan. 19, 2021 retrieved on [Dec. 8, 2023]. Retrieved from the internet <URL: https//www.phishlabs.com/blog/using-social-media-osint-to-determine-actor-locations/ > entire document.

International Searching Authority, International Search Report, Mar. 3, 2023, 66 pages.

* cited by examiner

AUTOMATED VULNERABILITY AND THREAT LANDSCAPE ANALYSIS

RELATED APPLICATION

This application claims priority under 35 USC § 119 to U.S. provisional patent application No. 63/317,157, titled "CYBER SECURITY SYSTEM" filed Mar. 7, 2022. This application also claims priority under 35 USC § 119 to U.S. provisional patent application No. 63/447,537 titled "AUTOMATED VULNERABILITY AND THREAT LANDSCAPE ANALYSIS" filed Feb. 22, 2023. All of which disclosure of such are incorporated herein by reference in their entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Cyber security and in an embodiment use of Artificial Intelligence in cyber security to discover emerging cyber threats from publicly available content propagating over various OSINT sources and assess potential exposure by an enterprise to these emerging cyber threats.

BACKGROUND

Over the last few years, enterprises have made significant investments in protecting their networked resources from cyber security threats (hereinafter, "cyber threats"). A "cyber threat" can be a threat facilitated by a critical vulnerability to the security of an enterprise and/or its computing devices, typically where the cyber threat is intended to disrupt normal operations or harm the enterprise network or computing device(s) connectable to that network. In most cases, cyber threats involve an attempted infiltration by unauthorized software or unauthorized activities to exploit a vulnerability of a targeted network and/or a targeted computing device communicatively coupled to the network. The unauthorized software, sometimes referred to as malware, may be designed to perpetrate malicious or criminal activity or even a nation-state attack.

To combat cyber threats, security administrators have deployed security controls throughout their enterprise networks and within the computing devices associated with the enterprise network. The operability of these security controls, such as networked security appliances for example, is occasionally updated based on the current cyber threat landscape. Traditionally, updates have been primarily governed by published reports issued by governmental security services that are focused on monitoring regional, national, or even multi-national threat landscapes. The reports provide security administrators with cyber security standards, guidelines, best practices, and other resources to assist them in combatting cyber threats prevalent in the current threat landscape. However, given that the reports are issued infrequently, such as every 30 or 60 days, augmenting vulnerability management has been resource intensive, involving the constant monitoring of security news feeds and intelligence sources for updating security controls.

Given the time-lag for learning about the current threat landscape, threat actor groups have shortened and more aggressively conducted cyberattack campaigns as well as more frequently altered their attack vectors. As a result, the reports concerning the current cyber threat landscape do not timely address emerging cyber threats. Moreover, as new critical vulnerabilities, such as Log4J and ProxyLogon for example, make news headline, security administrators are currently unable to determine whether their enterprise could be affected by the newly reported cyberthreat and what resources within the enterprise could be compromised.

Hence, a real-time cyber threat landscape analysis scheme is needed that leverages real-time public discourse over publicly available sources, especially communications by enterprises or individuals who are recently combat certain cyber threats so that similarly situated enterprises or individuals can take greater precautions in protecting their networks and/or computing devices against similar cyber threats that are emerging.

SUMMARY

Method, systems, and apparatus are disclosed for an Artificial Intelligence based cyber security system. The Artificial Intelligence based (AI-based) cyber security system may include an open-source intelligence (ONINT) monitoring engine, which is configured to (i) autonomously conduct, without human intervention, analytics on incoming (real-time) content provided via open-source intelligence (OSINT) sources and (ii) provide data associated with emerging cyber threats such as malware, a vulnerability, zero-day exploit, SaaS, email or endpoint-borne threats to security controls (e.g., cyber security appliances, prediction engines, etc.) for those enterprises that have exposure to the emerging cyber threat. From the data associated with the emerging threat (hereinafter, "emerging threat landscape data"), the security controls, which have in-depth knowledge of its enterprise's external attack surface, can assess whether the emerging cyber threat is actionable, whether the enterprise has exposure to the cyber threat, and what resources within the enterprise could be potentially compromised by the emerging cyber threat. Additionally, from the emerging threat landscape data, the security controls may be able to provide mitigation advice (in real time) that is specific to the enterprise so that it stays protected.

As an illustrative example, based on the incoming, emerging threat landscape data learned from content provided from the OSINT sources (hereinafter, or "public content") that may more resemble industry chatter than content ratified by a governmental agency, the OSINT monitoring engine may be configured to assist in altering operability of security modules within a security control (e.g., modules implemented as part of a cyber security appliance to identify cyber threats) and/or resources within the enterprise (e.g., computing devices in the enterprise). The "OSINT source" may constitute one or more covert sources and/or one or more publicly available sources that provide content for public consumption, such as social media platforms (e.g., Twitter®, Facebook®, etc.), websites including news websites or web service providers, blogs, vlogs, streaming services, podcasts, discussion groups, and/or dark web forums. The "emerging threat landscape data" features information that identifies an emerging cyber threat and perhaps its intent. As an illustrative example, the emerging threat landscape data may include, but is not limited or restricted to, the name of the emerging cyber threat, the threat type, the targeted industry vertical, the targeted geographic location, the potential threat actor group responsible for the emerging cyber threat, and/or general hacking approach being used. When available from the incoming content from the OSINT source(s), the emerging threat landscape data also may include information associated with the targeted software (e.g., operating system "OS" type, browser type, version number, etc.).

The OSINT monitoring engine may be further configured to provide the emerging threat landscape data associated with a potential, emerging cyber threat to a prediction engine. The "prediction engine" is a security control configured to conduct simulations as to what potential effects would be realized by an enterprise network with infiltration by the cyber threat into an enterprise network monitored by the protection engine. Depending on the simulation results, the prediction engine may provide information associated with the simulation results to other security controls that may assist in further adjusting operability of one or more security controls and/or resources within the enterprise network in order to mitigate the risk of a security breach. As an illustrative example, the prediction engine may provide information from its simulations to modules operating as part of the cyber security appliance in order to adjust operability of the cyber security appliance (e.g., increase analysis scrutiny) and operability of resources for each enterprise that are "at risk" to the emerging cyber threat.

Within the OSINT monitoring engine, the incoming (real-time) public content is analyzed to determine the credibility of the OSINT source. If the determined credibility exceeds a prescribed threshold, the OSINT monitoring engine conducts analytics on the public content, such as conducting natural language processing (NLP) analyses for example, to uncover data directed one or more emerging cyber threats and/or active threat actor groups (emerging threat landscape data). Thereafter, the emerging threat landscape data is provided to the prediction engine to identify potential groups who may target the enterprise or approaches that the enterprise would be especially susceptible to cyber threat attack (hereinafter, "cyberattack"), which can be played out as part of a simulation (i.e., a simulated attack engagement).

Data on emerging cyber threats or likely systems impacted by emerging vulnerabilities can also be used to promote possible security platform reconfiguration to reduce the risk on computing devices in the enterprise network being exposed to a potential cyberattack. As an illustrative example, the data associated with the emerging cyber threats (emerging threat landscape data) may be provided to a first module of the cyber security appliance (e.g., a cyber threat analyst module) to attempt to detect this ongoing behavior, and/or fed to a second module (e.g., an autonomous response module) to increase its reactivity to the type of behavior present in the emerging cyber threat or that may indicate the vulnerability is exploited. Finally, this data can be surfaced to a user or even used to detect overall trends across the wider threat landscape.

As described herein, a significant advantage associated with the deployment of the OSINT monitoring engine pertains to the content is fed into an existing security control such as a cyber security appliance and/or prediction engine as described below. Stated differently, no new alerts are surfaced; instead, data is fed into the cyber security appliance and/or prediction engine and intelligently inform an autonomous response module to determine whether any additional actions are needed to mitigate exposure by the enterprise to the emerging cyber threat.

Another significant advantage comes from our unique understanding of the methods of attack to which a client is vulnerable. The security system can more accurately model which Common Vulnerabilities and Exposures (CVEs), Advance Persistent Threat (APT) groups, and/or other malware to which the enterprise is more vulnerable based on existing awareness of the architecture and resources associated with the enterprise.

Also, conducting analytics and becoming more familiar with emerging threat landscape learned from public content made available by the OSINT sources enables the cyber security appliance provider to operate as the "source of truth" within an enterprise. By assessing each enterprise's exposure to an emerging cyber threat autonomously (i.e., with no or little human invention) through its in-depth knowledge of the enterprise's unique external attack surface in a manner of hours instead of days, security administrators can more confidently rely on user interfaces generated by an AI-based cyber security system, inclusive of the OSINT monitoring engine and the prediction engine, to assess whether cyber threat headlines over the OSINT sources pertain to them. Stated differently, the OSINT monitoring engine, in combination with the cyber security appliance and prediction engine, significantly reduce the amount of time required to determine (i) whether a "newsworthy" emerging cyber threat is an actionable threat against which enterprises that subscribe to services offered by the OSINT monitoring engine, and for those likely-targeted enterprises, (ii) what are their vulnerabilities and (iii) what are suggestion actions to enhance protection of their enterprise network. This improves the success rate of mitigation efforts and provides security administrators with the ability to give their superiors "peace-of-mind" that proactive measures have already commenced.

According to one embodiment of the disclosure and described below, the OSINT monitoring engine features a source evaluation module, a content processing engine, and a content classification engine. The source evaluation module determines a confidence level associated with a source of the incoming content and refrains from providing textual information associated with the incoming content unless the confidence level associated with the source is equal to or exceeds a prescribed threshold. The content processing engine identifies salient information from the textual information for use in identifying an emerging cyber threat. The content classification module classifies the salient information to identify characteristics associated with the emerging cyber threat for subsequent adjustment of security controls and/or network resources to mitigate the risks associated with the emerging cyber threat.

These and other features of the design provided herein can be better understood with reference to the drawings, description, and claims, all of which form the disclosure of this patent application.

DRAWINGS

The drawings refer to some embodiments of the design provided herein in which.

Figure 8:
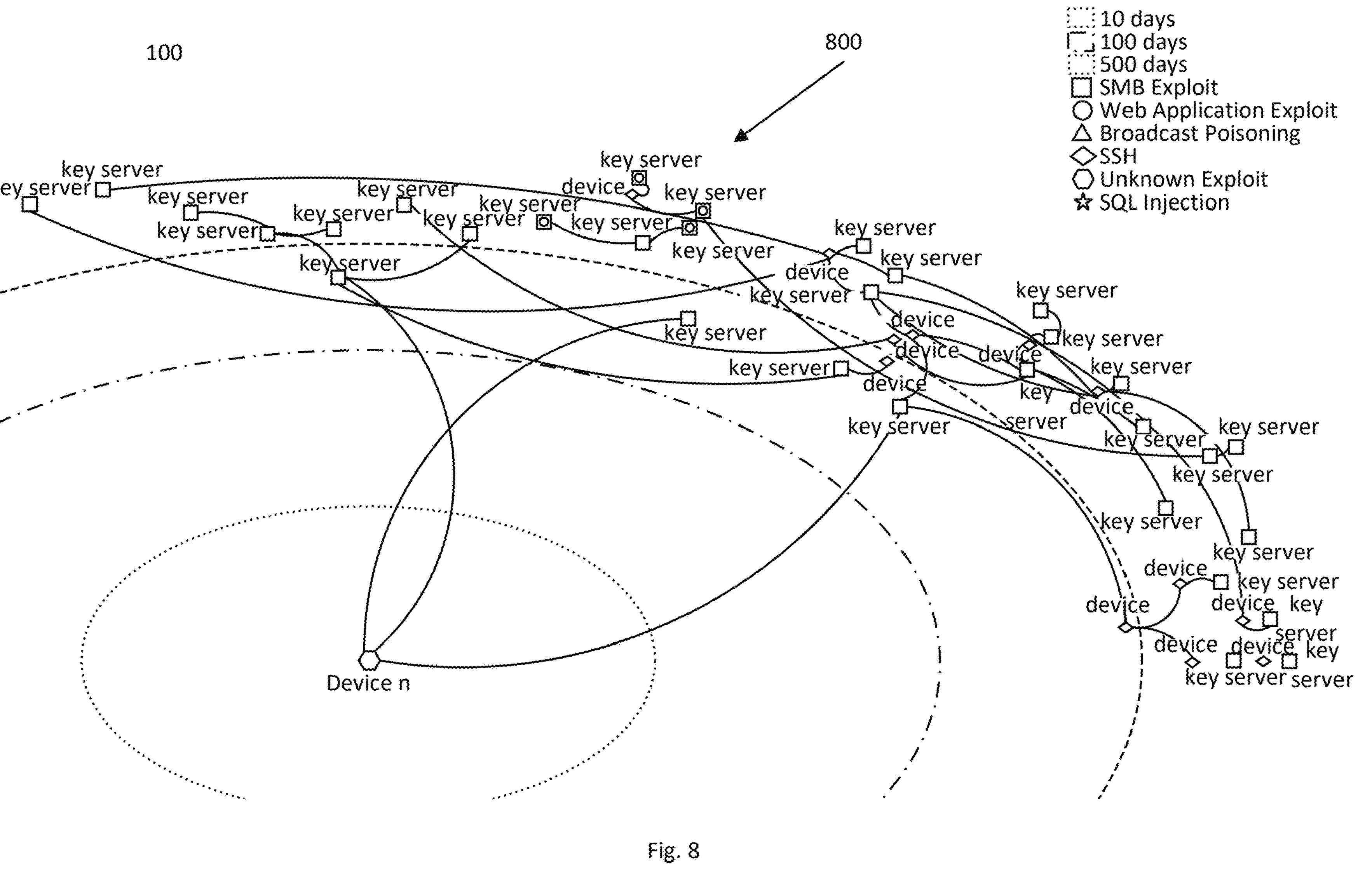

FIG. 8 illustrates a diagram of an embodiment of a cyber threat prediction engine and its AI-based simulations constructing a graph of nodes in an example network and simulating how the cyberattack might likely progress in the future tailored with an innate understanding of a normal behavior of the nodes in the system being protected and a current operational state of each node in the graph of the protected system during simulations of cyberattacks.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the embodiments of different components of the AI-based cyber security system. It will be apparent, however, to one of ordinary skill in the art that the disclosed embodiment can be practiced without these specific details. In other instances, well known components or methods have not been described in detail but rather in a block diagram in order to avoid unnecessarily obscuring one of the disclosed embodiments of the invention. Further, specific numeric reference, such as a 'first' domain module or 'first' operation, should not be interpreted as a literal sequential order, but rather, may be interpreted that the first domain module may have different functionality than the second domain module and the first operation may be independent from the second operation. Thus, the specific details set forth are merely exemplary.

Also, the features implemented in one embodiment may be implemented in another embodiment where logically possible. The specific details can be varied from and still be contemplated to be within the spirit and scope of the inventive aspect described herein.

I. Terminology

In the following description, certain terminology is used to describe aspects of the invention. In certain situations, each of the terms "engine," "module" and "component" is representative of hardware, firmware, and/or software that is configured to perform one or more functions. As hardware, the engine (or module or component) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the engine (or module or component) may be software in the form of one or more software modules, which may be configured to operate as its counterpart circuitry. For instance, a software module may be a software instance that operates as or is executed by a processor, namely a virtual processor whose underlying operations is based on a physical processor such as virtual processor instances for Microsoft® Azure® or Google® Cloud Services platform or an EC2 instance within the Amazon® AWS infrastructure, for example. Illustrative examples of the software module may include an executable application, a daemon application, an application programming interface (API), a subroutine, a function, a procedure, an applet, a servlet, a routine, source code, a shared library/dynamic load library, or simply one or more instructions.

The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, a hard disk drive, an optical disc drive, a portable memory device, or storage instances as described below. As firmware, the engine (or logic) may be stored in persistent storage.

The term "computerized" generally represents that any corresponding operations are conducted by hardware in combination with software and/or firmware.

The terms "computing device" or "device" should be generally construed as physical or virtualized device with data processing capability, data storage capability, and/or a capability of connecting to any type of network, such as a public cloud network, a private cloud network, or any other network type. Examples of a computing device may include, but are not limited or restricted to, the following: a server, a router or other intermediary communication device, an endpoint (e.g., a laptop, a smartphone, a tablet, a desktop computer, a netbook, IoT device, networked wearable, etc.) or virtualized devices being software with the selected functionality. A "security control" is a type of computing device responsible for detecting and/or defending against cyber threats attempt to infiltrate the enterprise.

A "OSINT monitoring engine" may constitute a physical or virtual computing device that may be (i) used by a third-party security vendor contracted by the enterprise or accessed by a security analyst associated with a contracted enterprise or (ii) provisioned to autonomous perform the functions of a security analyst such as, for example, through the use of AI models trained through machine learning (ML) techniques, natural language processing (NLP), or the like. The OSINT monitoring engine may be deployed as part of security operations center (SOC), deployed within a cloud network as a cloud service, deployed as a local (on-premises) service, or the like.

"Security controls" generally refers to a product, whether deployed on-premises or cloud-based, designed to monitor and/or collect information realized through analytics conducted on suspicious objects such as information observed through processing (e.g., logged events, setting changes, etc.), information sent/received over a network data (e.g., incoming content provided from OSINT sources, incoming content associated with peer-to-peer communications such as electronic mail (email) messages, texts, etc.). Examples of security controls generally include threat (or malware) detection systems, anti-virus software, endpoint agents, firewalls, or other cyber security-based systems such as the OSINT monitoring engine and/or the prediction engine.

The term "message" generally refers to as information placed in a prescribed format that is transmitted in accordance with a suitable delivery protocol or accessible through a logical data structure such as an Application Programming Interface (API) or a web service or service such as a portal. Examples of the delivery protocol include, but are not limited or restricted to HTTP (Hypertext Transfer Protocol); HTTPS (HTTP Secure); Short Message Service (SMS), Simple Mail Transfer Protocol (SMTP); iMESSAGE™; iCLOUD Private Relay; Instant Message Access Protocol (IMAP); or the like. For example, a message may be provided as a continuous data stream, one or more packets or frames, or any other series of bits having the prescribed, structured format.

The term "coupled" and any tenses thereof may be defined as meaning directly or indirectly connected in a physical or logical manner, where a first component is communicatively coupled to a second component by being either in direct connection or indirect connection via the second component.

In certain instances, the terms "compare," comparing," "comparison," or other tenses thereof generally mean determining if a match (e.g., identical or a prescribed level of correlation) is achieved between information associated with two items under analysis. Also, the phrase "one or more" may be denoted by the symbol "(s)" such as "one or more elements" may be represented as "element(s)".

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

One embodiment of the disclosed invention is directed to an open-source intelligence (OSINT) monitoring engine, namely an AI-driven system for monitoring incoming content received from OSINT sources to discover emerging cyber threats and to forward emerging threat landscape data to protect one or more enterprise networks that subscribe to this multi-tenant system. The OSINT monitoring engine features a source evaluation module, a content processing engine, and a content classification module.

Herein, for this embodiment, the source evaluation module is configured to determine a confidence level associated with a source of the incoming content, where the source evaluation module refrains from providing textual information associated with the incoming content unless the confidence level associated with the source is equal to or exceeds a prescribed threshold. When the confidence level associated with the source is equal to or exceeds the prescribed threshold, the content processing engine processes the textual information to identify salient information for use in identifying an emerging cyber threat. The content classification module is configured to receive the salient information and classify the salient information to identify characteristics associated with the emerging cyber threat, where all or a portion of this salient information is included as the emerging threat landscape data provided to a cyber security appliance and prediction engine that is responsible for determining the effect of a cyber threat on an enterprise network that it is protecting and alter functionality of modules within the cyber security appliance and/or resources of the enterprise network. The security platform will be discussed with the OSINT monitoring engine interwoven into the discussion to provide a holistic understanding of its operations.

II. Cyber Security Appliance

Figure 1:
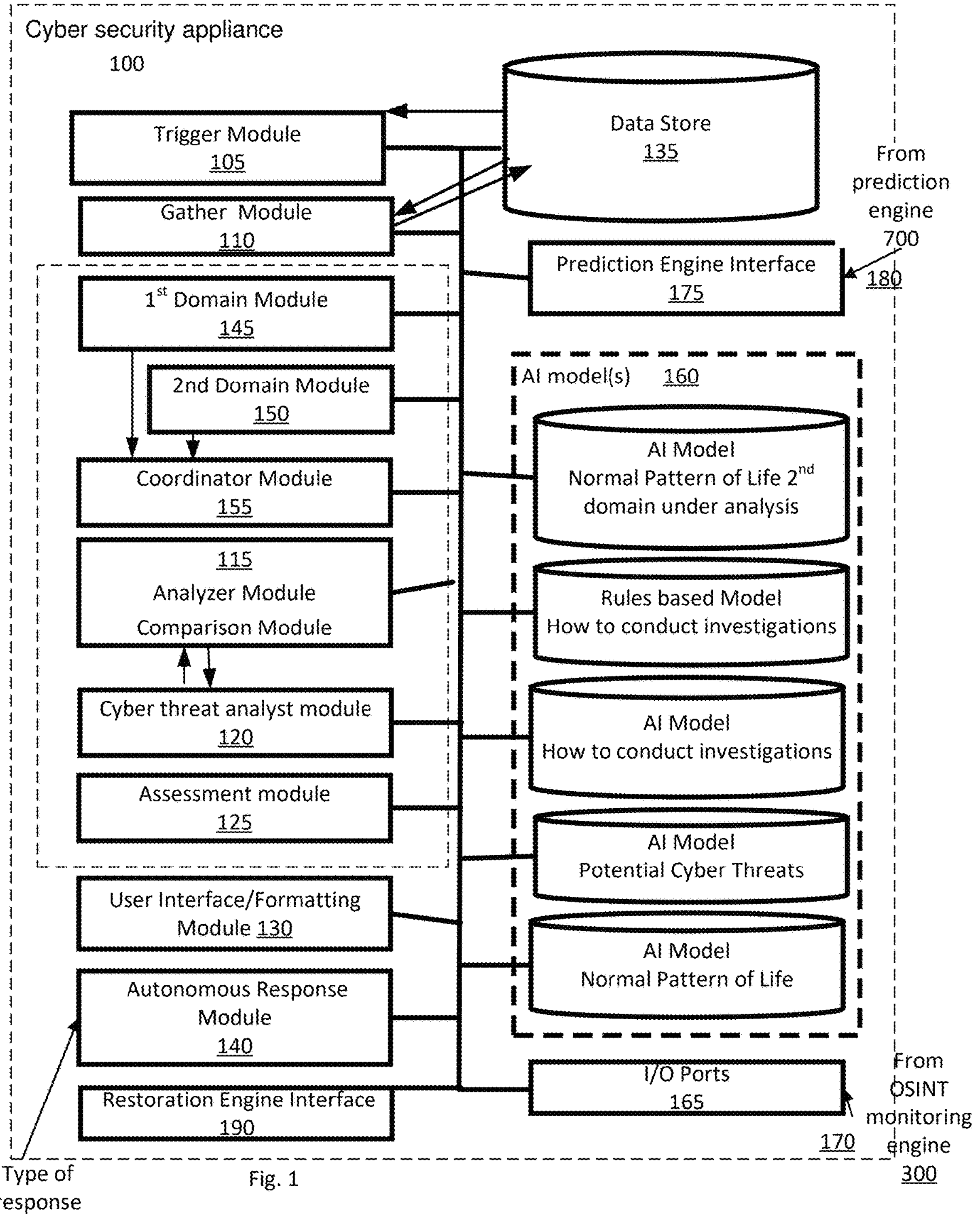
FIG. 1 illustrates an embodiment of a block diagram of an example AI-based cyber security appliance adapted for communicative coupling to an OSINT monitoring engine.

Referring to FIG. 1, a block diagram of an embodiment of the AI-based cyber security appliance 100 is shown. The cyber security appliance 100 is configured with components, such as Artificial Intelligence (AI) models and modules, configures to protect an enterprise (network/domain) from cyber threats (e.g., malicious files, malicious email messages, etc.). As shown, according to one embodiment of the disclosure, the AI-based cyber security appliance 100 may include a trigger module 105, a gather module 110, an analyzer module 115, a cyber threat analyst module 120, an assessment module 125, a formatting module 130, a data store 135, an autonomous response module 140, a first ($1^{st}$) domain module 145, a second ($2^{nd}$) domain module 150, and a coordinator module 155, one or more AI models 160 (hereinafter, AI model(s)"), and/or other modules. The AI model(s) 160 may be trained with machine learning on a normal pattern of life for entities in the network(s)/domain(s) under analysis, with machine learning on cyber threat hypotheses to form and investigate a cyber threat hypothesis on what are a possible set of cyber threats and their characteristics, symptoms, remediations, etc., and/or trained on possible cyber threats including their characteristics and symptoms.

In an embodiment, the cyber security appliance 100 can protect all of the devices (e.g., computing devices on the network(s)/domain(s) being monitored by monitoring domain activity). For example, a network domain module (e.g., first domain module 145) may communicate with network sensors to monitor network traffic going to and from the computing devices on the network as well as receive secure communications from software agents embedded in host computing devices/containers. The steps below will detail the activities and functions of several of the components in the cyber security appliance 100.

The gather module 110 may be configured with one or more process identifier classifiers. Each process identifier classifier may be configured to identify and track one or more processes and/or devices in the network, under analysis, making communication connections.

The data store 135 cooperates with the process identifier classifier to collect and maintain historical data of processes and their connections, which is updated over time as the network is in operation. Individual processes may be present in merely one or more domains being monitored. In an example, the process identifier classifier can identify each process running on a given device along with its endpoint connections, which are stored in the data store 135.

Figure 5:
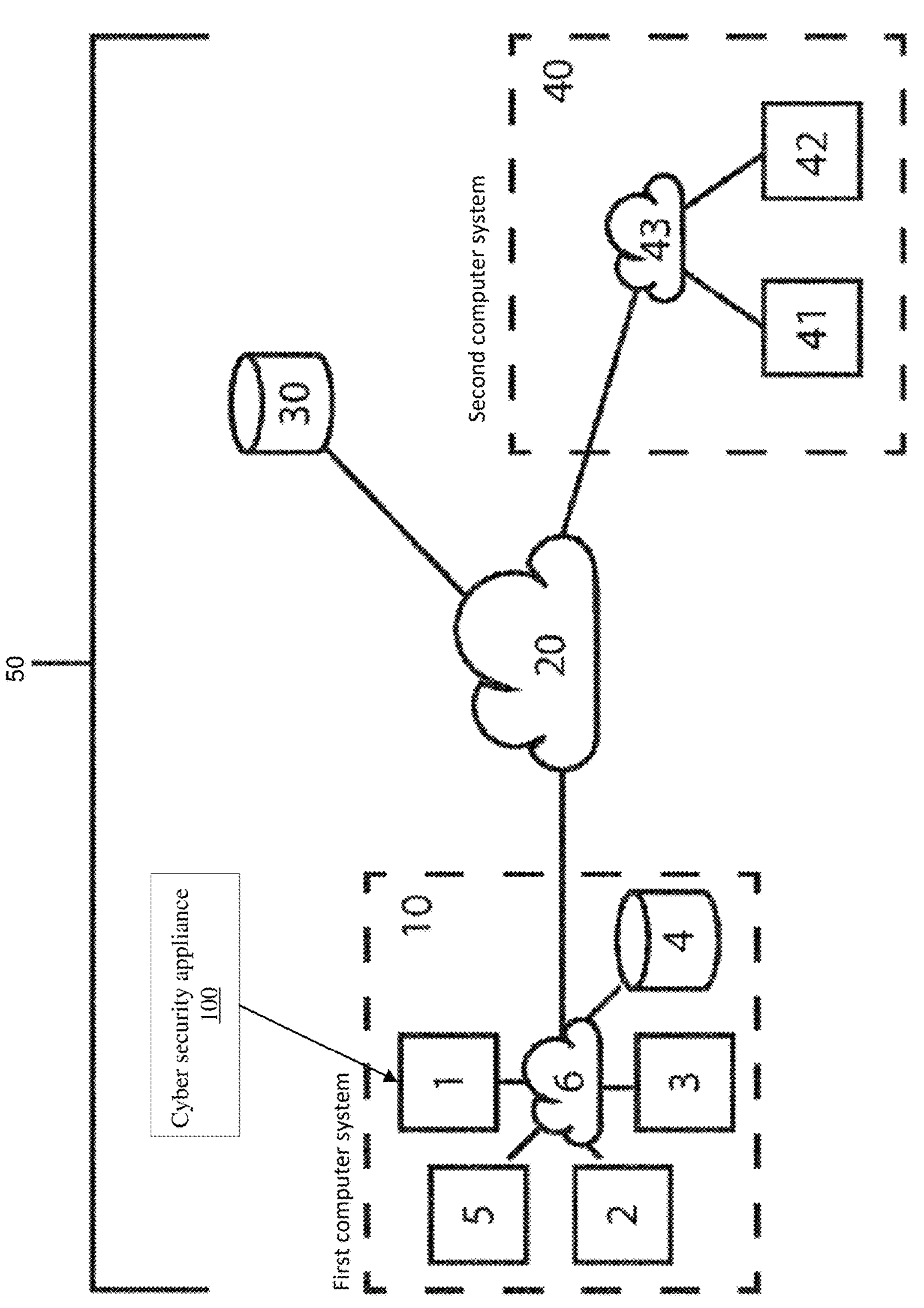
FIG. 5 illustrates an exemplary AI-based cyber security system deploying a cyber threat appliance to protect against cyber threats.

The analyzer module 115 can cooperate with the AI model(s) 160 or other modules in the cyber security appliance 100 to confirm a presence of a cyberattack against one or more domains in an enterprise's system (e.g., see system/enterprise network 50 of FIG. 5). A process identifier in the analyzer module 115 can cooperate with the gather module 110 to collect any additional data and metrics to support a possible cyber threat hypothesis.

The cyber threat analyst module 120 can cooperate with the internal data sources as well as external data sources to collect data in its investigation. More specifically, the cyber threat analyst module 120 can cooperate with the other modules and the AI model(s) 160 in the cyber security appliance 100 to conduct a long-term investigation and/or a more in-depth investigation of potential and emerging cyber threats directed to one or more domains in an enterprise's system.

Herein, the cyber threat analyst module 120 and/or the analyzer module 115 can also monitor for other anomalies, such as model breaches, including, for example, deviations for a normal behavior of an entity, and other techniques discussed herein. As an illustrative example, the analyzer module 115 and/or the cyber threat analyst module 120 can cooperate with the AI model(s) 160 trained on potential cyber threats in order to assist in examining and factoring these additional data points that have occurred over a given timeframe to see if a correlation exists between 1) a series of two or more anomalies occurring within that time frame and 2) possible known and unknown cyber threats.

According to one embodiment of the disclosure, the cyber threat analyst module 120 allows two levels of investigations of a cyber threat that may suggest a potential impending cyberattack. In a first level of investigation, the analyzer module 115 and AI model(s) 160 can rapidly detect and then the autonomous response module 140 will autonomously respond to overt and obvious cyberattacks. However, thousands to millions of low level anomalies occur in a domain under analysis all of the time; and thus, most other systems need to set the threshold of trying to detect a cyberattack at level higher than the low level anomalies examined by the cyber threat analyst module 120 just to not have too many false positive indications of a cyberattack when one is not actually occurring, as well as to not overwhelm a human cyber security analyst receiving the alerts with so many notifications of low level anomalies that they just start tuning out those alerts. However, advanced persistent threats attempt to avoid detection by making these low-level anomalies in the system over time during their cyberattack before making their final coup de grâce/ultimate mortal blow against the system (e.g., domain) being protected. The cyber threat analyst module 120 also conducts a second level of investigation over time with the assistance of the AI model(s) 160 trained with machine learning on how to form cyber threat hypotheses and how to conduct investigations for a cyber threat hypothesis that can detect these advanced persistent cyber threats actively trying to avoid detection by looking at one or more of these low-level anomalies as a part of a chain of linked information.

Figure 4:
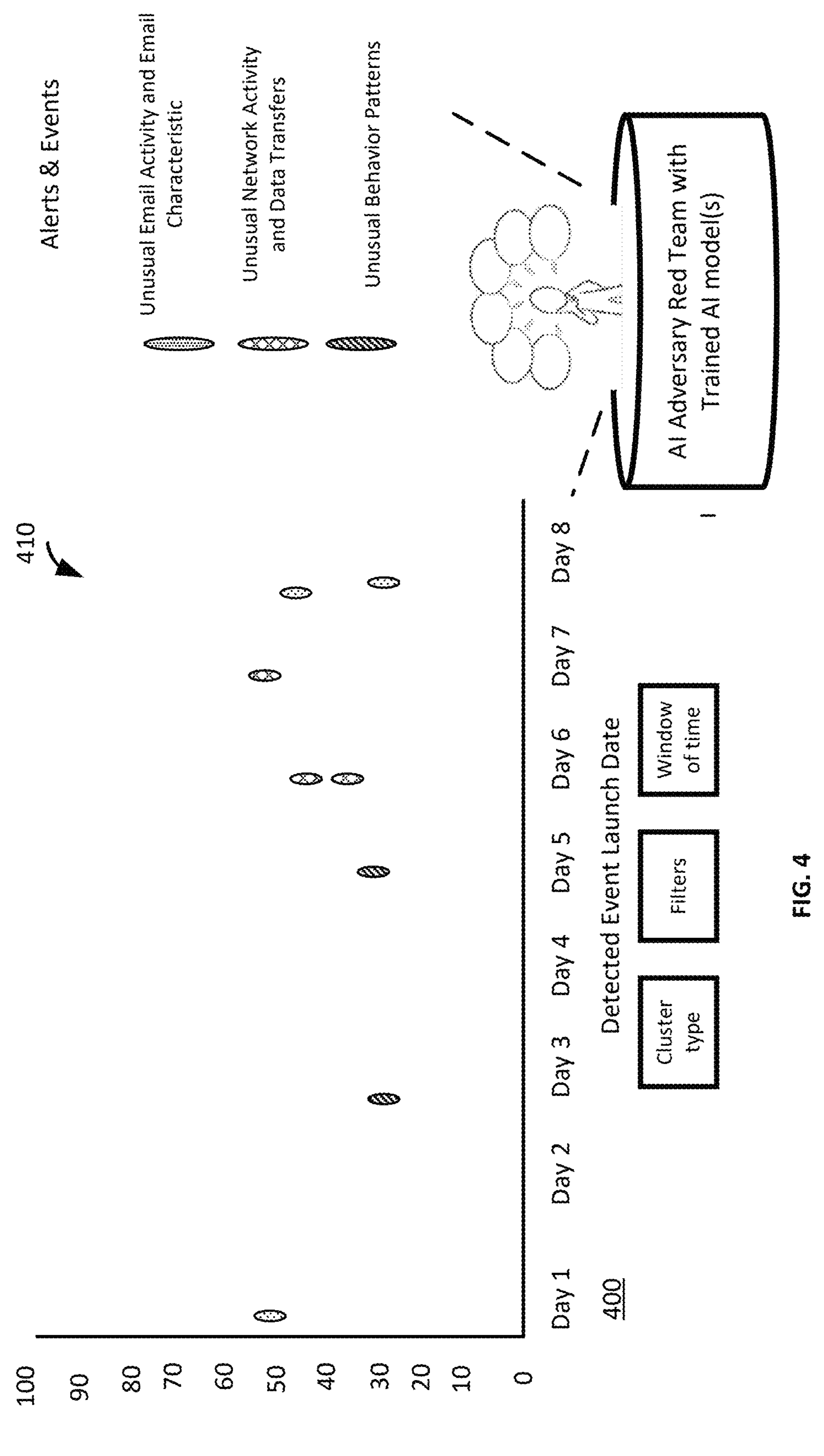
FIG. 4 illustrates a graph of an embodiment of an example chain of unusual behavior for, in this example, the email activities as well as IT activities deviating from a normal pattern of life for this user and/or device in connection with the rest of the network under analysis.

Note, a data analysis process can be algorithms/scripts written by humans to perform their function discussed herein; and can in various cases use AI classifiers as part of their operation. The cyber threat analyst module 120 forms in conjunction with the AI model(s) 160 trained with machine learning on how to form cyber threat hypotheses and how to conduct investigations for a cyber threat hypothesis investigate hypotheses on what are a possible set of cyber threats. The cyber threat analyst module 120 can also cooperate with the analyzer module 115 with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the AI model(s) 160 trained with machine learning on the normal pattern of life of entities in the system. For example, as shown in FIG. 4, the cyber threat analyst module 120 may perform several additional rounds 400 of gathering additional information, including abnormal behavior, over a period of time, in this example, examining data over a 7-day period to determine causal links between the information. The cyber threat analyst module 120 may submit to check and recheck various combinations/a chain of potentially related information, including abnormal behavior of a device/user account under analysis for example, until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted. For this embodiment, a human cyber security analyst is needed to further investigate the anomaly (and/or anomalies) of interest included in the chain of potentially related information.

Returning back to FIG. 1, an input from the cyber threat analyst module 120 of a supported hypothesis of a potential cyber threat will trigger the analyzer module 115 to compare, confirm, and send a signal to act upon and mitigate that cyber threat. In contrast, the cyber threat analyst module 120 investigates subtle indicators and/or initially seemingly isolated unusual or suspicious activity such as a worker is logging in after their normal working hours or a simple system misconfiguration has occurred. Most of the investigations conducted by the cyber threat analyst module 120 cooperating with the AI model(s) 160 trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically, during the investigations, several rounds of data gathering to support or refute the long list of potential cyber threat hypotheses formed by the cyber threat analyst module 120 will occur before the algorithms in the cyber threat analyst module 120 will determine whether a particular cyber threat hypothesis is supported, refuted, or needs further investigation by a human. The rounds of data gathering may build chains of linked low-level indicators of unusual activity along with potential activities that could be within a normal pattern of life for that entity to evaluate the whole chain of activities to support or refute each potential cyber threat hypothesis formed. (See again, for example, FIG. 4 and a chain of linked low-level indicators, including abnormal behavior compared to the normal patten of life for that entity, all under a score of 50 on a threat indicator score). The investigations by the cyber threat analyst module 120 can happen over a relatively long period of time and be far more in depth than the analyzer module 115 which will work with the other modules and AI model(s) 160 to confirm that a cyber threat has in fact been detected.

The gather module 110 may further extract data from the data store 135 at the request of the cyber threat analyst module 120 and/or analyzer module 115 on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The gather module 110 cooperates with the cyber threat analyst module 120 and/or analyzer module 115 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module 120 is configured to cooperate with the AI model(s) 160 trained with machine learning on how to form cyber threat hypotheses and how to conduct investigations for a cyber threat hypothesis to form and investigate hypotheses on what are a possible set of cyber threats and then can cooperate with the analyzer module 115 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 160 trained with machine learning on the normal pattern of life/normal behavior of entities in the domains under analysis.

Note, in the first level of threat detection, the gather module 110 and the analyzer module 115 cooperate to supply any data and/or metrics requested by the analyzer module 115 cooperating with the AI model(s) 160 trained on possible cyber threats to support or rebut each possible type of cyber threat. Again, the analyzer module 115 can cooperate with the AI model(s) 160 and/or other modules to rapidly detect and then cooperate with the autonomous response module 140 to autonomously respond to overt and obvious cyberattacks, (including ones found to be supported by the cyber threat analyst module 120).

As a starting point, the AI-based cyber security appliance 100 can use multiple modules, each capable of identifying abnormal behavior and/or suspicious activity against the AI model(s) 160 of normal behavior for the entities in the network/domain under analysis, which is supplied to the analyzer module 115 and/or the cyber threat analyst module 120. The analyzer module 115 and/or the cyber threat analyst module 120 may also receive other inputs such as AI model breaches, AI classifier breaches, etc. a trigger to start an investigation from an external source.

Many other model breaches of the AI model(s) 160 trained with machine learning on the normal behavior of the system can send an input into the cyber threat analyst module 120 and/or the trigger module 105 to trigger an investigation to start the formation of one or more hypotheses on what are a possible set of cyber threats that could include the initially identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v), etc.

Note, the cyber threat analyst module 120 cooperating with the AI model(s) 160 trained with machine learning on how to form cyber threat hypotheses and how to conduct investigations for a cyber threat hypothesis in the AI-based cyber security appliance 100 provides an advantage as it reduces the time taken for human led or cyber security investigations, provides an alternative to manpower for small organizations and improves detection (and remediation) capabilities within the cyber security appliance 100.

The cyber threat analyst module 120, which forms and investigates hypotheses on what are the possible set of cyber threats, can use hypotheses mechanisms including any of 1) one or more of the AI model(s) 160 trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI model(s) 160 trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module 120 and/or the analyzer module 115 can feed the cyber threat details to the assessment module 125 to generate a threat risk score that indicate a level of severity of the cyber threat.

According to one embodiment of the disclosure, the assessment module 125 can cooperate with the AI model(s) 160 trained on possible cyber threats to use AI algorithms to identify actual cyber threats and generate threat risk scores based on both the level of confidence that the cyber threat is a viable threat and the severity of the cyber threat (e.g., attack type where ransomware attacks has greater severity than phishing attack; degree of infection; computing devices likely to be targeted, etc.). The threat risk scores be used to rank alerts that may be directed to enterprise or computing device administrators. This risk assessment and ranking is conducted to avoid frequent "false positive" alerts that diminish the degree of reliance/confidence on the cyber security appliance 100.

Figure 3A:
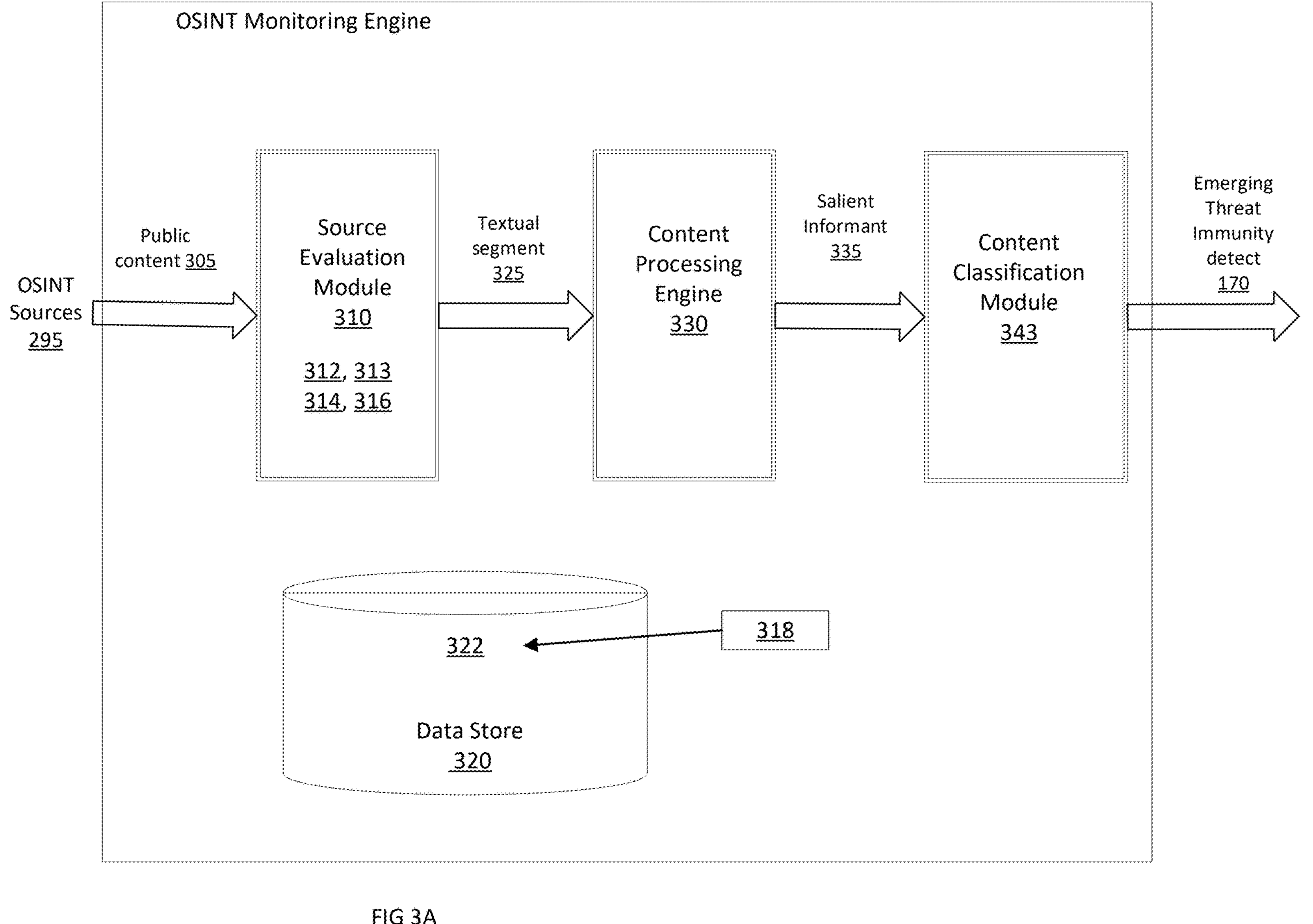
FIG. 3A illustrates an exemplary embodiment of a logical representation of the OSINT monitoring engine of FIGS. 1-2.
Figure 3B:
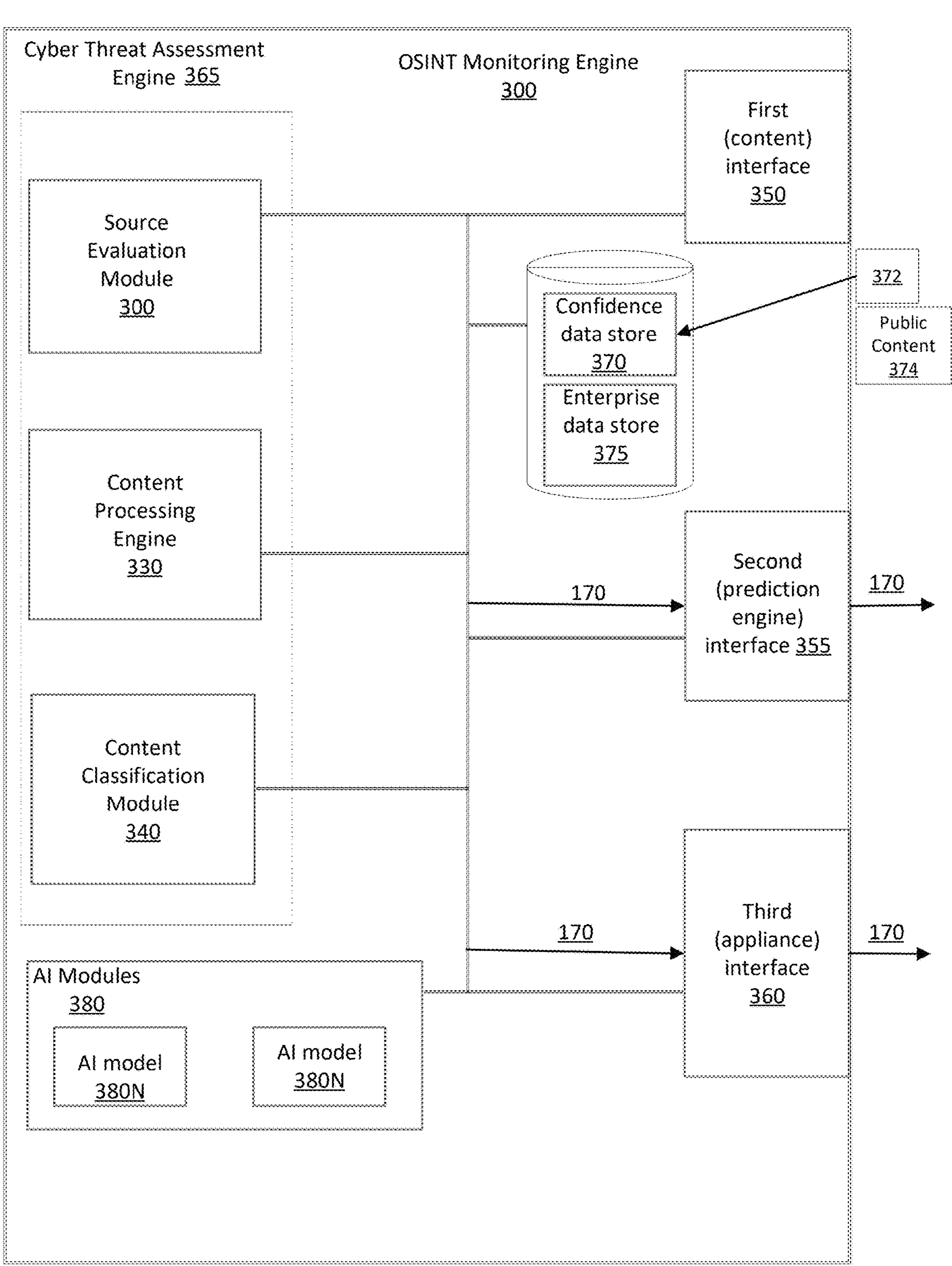
FIG. 3B illustrates an exemplary embodiment of the internal architecture of the OSINT monitoring engine of FIG. 3A.

As further shown in FIG. 1, the cyber security appliance 100 features input/output (I/O) ports 165 that are adapted to receive data 170 from an OSINT monitoring engine 300 shown in FIGS. 3A-3B. Herein, the received data 170 is associated with an emerging threat determined from OSINT sources such as social media platforms, news-based platforms, blogs, and/or network-based forums such as dark web forums for example. The received data 170 (resultant data after NLP parsing and/or extraction of salient information for identifying an emerging cyber threat and perhaps its intent) may be referred to as "emerging threat landscape data 170." For clarity, the resultant data, whether in its entirety or a portion of the resultant data, may be uniformly referred to as emerging threat landscape data 170.

The OSINT monitoring engine 300 is configured to leverage OSINT sources (see sources 250 of FIG. 2) that are swamped with cyber threat information, but much of the information may be unreliable or non-actionable. The OSINT monitoring engine 300 evaluates content from OSINT sources by at least (i) determining, for each enterprise supported by the engine, whether the content is representative of an actionable, emerging cyber threat and (ii) generating the emerging threat landscape data 170 to be supplied to one or more cyber security appliances associated with those vulnerable enterprises. As shown in FIG. 1, the cyber security appliance 100 is associated with a vulnerable enterprise, and thus, the emerging threat landscape data 170 is provided to the cyber security appliance 100. Thereafter, the emerging threat landscape data 170 may be used for adjusting operability of at least the cyber threat analyst module 120, the assessment module 125, and/or the autonomous response module 140. Also, the OSINT monitoring engine 300 is configured to provide the emerging threat landscape data 170 to the prediction engine 700 of FIG. 7 as described below.

In particular, according to one embodiment of the disclosure, the gather module 110 may be configured to "collect" the emerging threat landscape data 170 via the I/O ports 165 for temporary storage in the data store 135 prior to processing by (i) the analyzer module 115 to assess whether the emerging threat landscape data 170 suggests that a cyberattack associated with the emerging cyber threat is occurring and/or (ii) the cyber threat analyst module 120 to conduct an investigation, based on the emerging threat landscape data 170 (e.g., content available from the OSINT source that identify a potential cyber threat or identify discovered or thwarted cyberattacks, threat actor groups, targeted industries, targeted software or entry points, etc.), whether the emerging cyber threat suggests a potential impending cyberattack on one or more domains in the enterprise. Thereafter, based on analysis of the emerging threat landscape data 170, operability of the cyber security appliance 100 and/or resources within the enterprise protected the cyber security appliance 100, may be altered to account for the security risks imposed by the potential cyber threats.

Alternatively, as another embodiment of the disclosure, in lieu of "pulling" data through active gathering by the cyber security appliance 100, the emerging threat landscape data 170 may be provided to the cyber security appliance 100. Herein, the emerging threat landscape data 170 may be provided from the OSINT monitoring engine 300 via the I/O ports 165 to the cyber security appliance 100 in a periodic basis or triggered upon classification of content as being a cyber threat that is actionable on a vulnerable enterprise protected by the cyber security appliance 100. The emerging threat landscape data 170 may be temporary stored in the data store 135 and accessed by any or all of the cyber threat analyst module 120, the assessment module 125, and/or the autonomous response module 140 within the cyber security appliance 100. Alternatively, in lieu of temporary storage, the emerging threat landscape data 170 may be provided directly to the cyber threat analyst module 120, the assessment module 125, and/or the autonomous response module 140. The emerging threat landscape data 170 is intended to prompt the autonomous response module 140 to adjust the functionality or operability of the cyber security appliance 100 and/or adjust the functionality or operability of resources within the enterprise that are susceptible to the cyber threat. Stated differently, the emerging threat landscape data 170 provided from the OSINT monitoring engine 300 may be utilized to adjust different functionality of the cyber security appliance 100 and/or resources that may be susceptible to the emerging cyber threat, where the degree of adjustment may be based on the severity of the emerging cyber threat against the enterprise.

Figure 7:
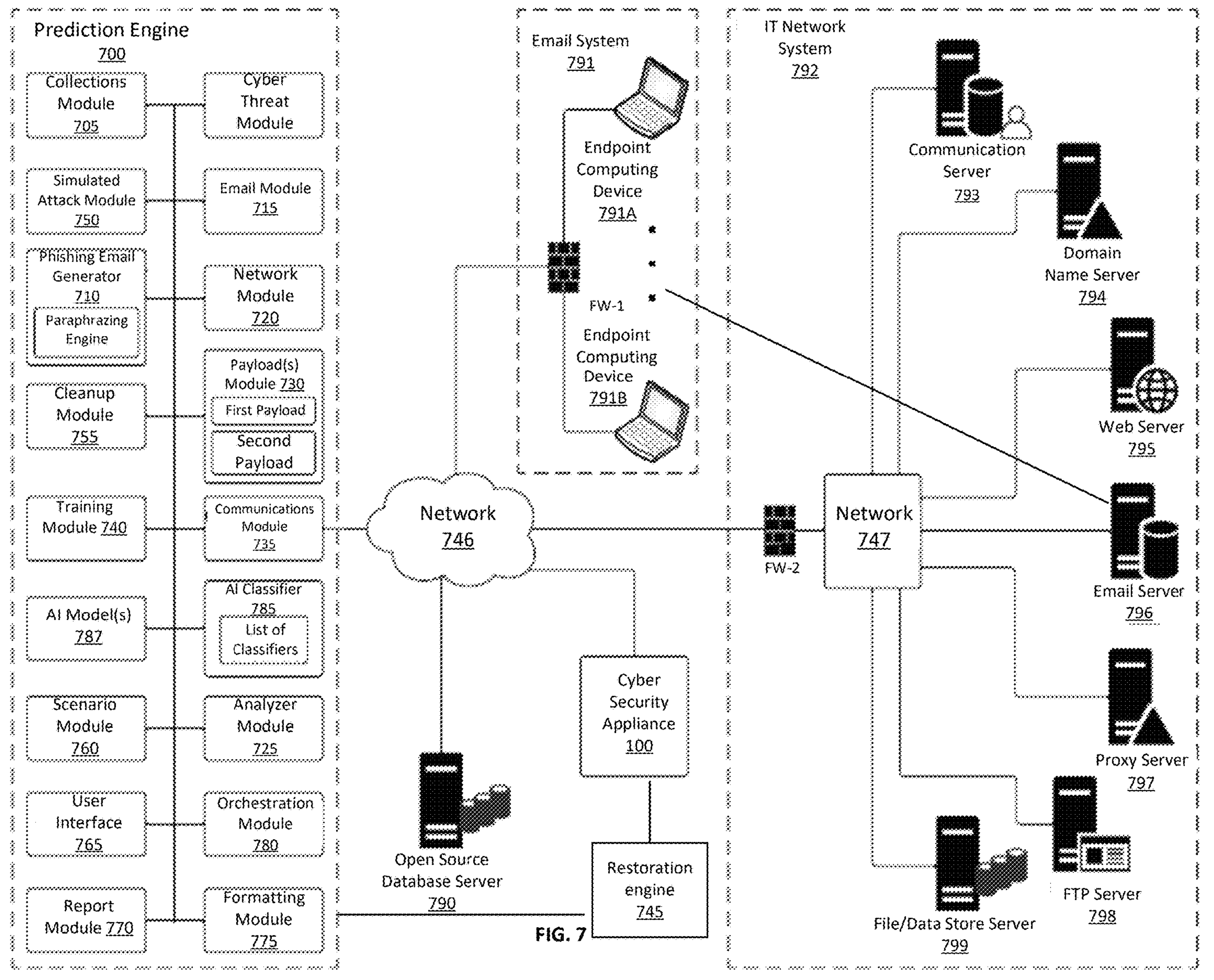
FIG. 7 illustrates a detailed block diagram of an embodiment of an AI-based cyber security system deploying the OSINT monitoring engine of FIGS. 3A-3B operating in concert with a prediction engine conducting AI-based simulations by constructing a graph of nodes of the system being protected.

As further shown in FIG. 1, the cyber security appliance 100 includes a prediction engine interface 175, which is configured to receive (or send) information to the prediction engine 700 of FIG. 7. According to one embodiment of the disclosure, the prediction engine interface 175 may be configured to receive information 180 from the prediction engine 700 of FIG. 7, where the information 180 is associated with results from simulations that are performed by the prediction engine 700 and based on at least the emerging threat landscape data 170. The information 180 may be used to further adjust functionality of the any or all of the cyber threat analyst module 120, the assessment module 125, and/or the autonomous response module 140 as well as generate mitigation advice specific to resources within the enterprise so that they stays protected.

As an illustrative example, the emerging threat landscape data 170 may be utilized to autonomously adjust, without human intervention, the functionality of the cyber threat analyst module 120, the assessment module 125, and/or the autonomous response module 140. The functionality may be adjusted by automatically increasing or decreasing weighting factors or thresholds that are relied upon by the modules to identify whether the emerging cyber threat is actionable and the severity of the emerging cyber threat against the resources within the enterprise. Additionally, the functionality of the above-identified modules 120, 125 and/or 140 may be adjusted by adjusting the metrics being analyzed to determine the severity of the cyber threat and preventive measures. Additionally, or in the alternative, the functionality of resources within the enterprise associated with the cyber security appliance 100 may also be altered by the autonomous response module 140 in response to the emerging threat landscape data 170.

As an illustrative example, the autonomous response module 140 may be configured to alter functionality of a resource within a vulnerable enterprise by assisting in the publishing, on a dashboard accessible to enterprise security administrators, a summary of the emerging cyber threat, the software vulnerable to the emerging cyber threat, and the resources within the enterprise network that utilize the vulnerable software. This capability assists the security administrators by enabling them to quickly determine whether an enterprise is affected by the emerging cyber threat, and thus, eliminate the lengthy, manual processes that have traditionally taken days or weeks to decide whether the enterprise is vulnerable and in what resources. This elimination (or mitigation) of delays in identifying emerging cyber threat protects against aggressive, fast-moving threat attack groups from breaching the enterprise.

Similarly, the prediction engine 700 may be configured to utilize the emerging threat landscape data 170 as part of a number of simulations to understand the effects on the enterprise by the emerging cyber threat and generate results that may be used to further adjust (or "tune") the functionality of the cyber security appliance 100 (e.g., cyber threat analyst module 120, the assessment module 125, and/or the autonomous response module 140) and/or the resources of the enterprise protected by the cyber security appliance 100. Stated differently, the information 180 from the prediction engine 700 via the prediction engine interface 175 provides a secondary "tuning" of the operability of certain modules within the cyber security appliance 100 and/or resources within the enterprise.

III. Platform Architecture

Figure 2:
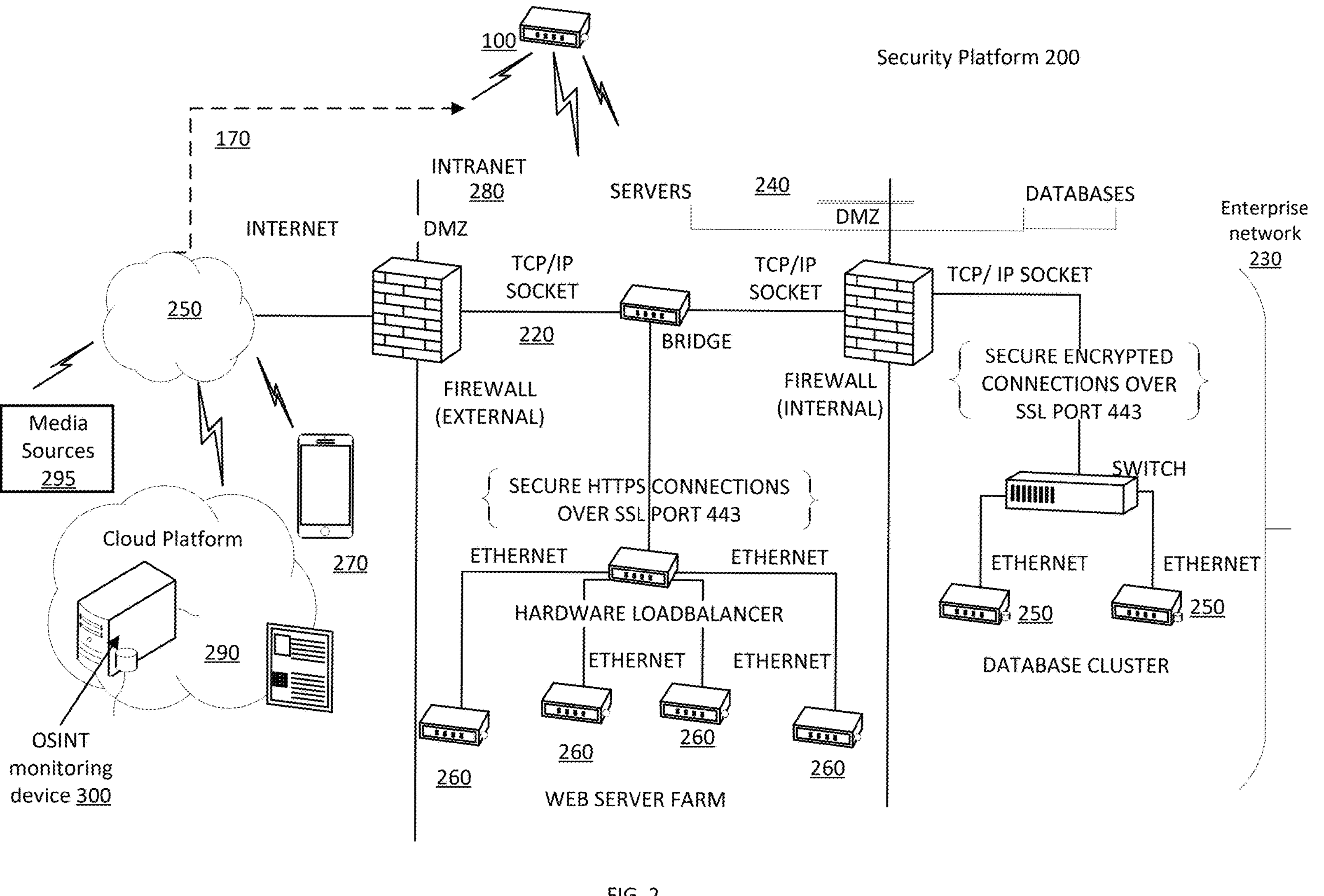
FIG. 2 illustrates an embodiment of the OSINT monitoring engine communicatively coupled to the AI-based cyber security appliance communicatively coupled to a security platform to protect a system.

Referring now to FIG. 2, an exemplary embodiment of the AI-based cyber security appliance 100 deployed as part of a security platform 200. The security platform 200 may provide different security controls 210 connectivity to a network 220 of the security platform 200. The security platform 200 is part of an enterprise network 230, which may further include one or more computing devices 240 such as database servers 250, web servers 260, networking devices 270 (e.g., bridge, switch, router, load-balancers, gateways, and/or firewalls), endpoint devices with connectivity to resources within the enterprise network 230 as well as a publicly accessible network 280 (e.g., the Internet). The endpoint devices 270 may include, but are not limited or restricted to desktop computers, laptops, smart phones, tablets, wearables, smart appliances, or the like.

The network 230 further supports communications between resources within the security platform 200 (e.g., servers 250/260, networking devices 270 and/or (ii) external-facing resources from the security platform 200, such as the cyber security appliance 100 that is communicatively coupled to the OSINT monitoring engine 300 deployed within a public cloud 290. The OSINT monitoring engine 300 is adapted to receive content from OSINT sources 295 (e.g., publicly available media sources, etc.).

The security controls 210 operate as probes and detectors that are configured to monitor, for example, network-based activity (e.g., email activity, text or Short Message Service (SMS) activity, etc.) and computing device activity (e.g., download activity based on volume, day, time of day, etc.); credential update/modification activity (e.g., credential changes, failed access attempts to a resource, etc.); and/or resource activity (e.g., attempted/successful accesses to enterprise resources, etc.). The security controls 210 provide the monitored data (or a version of the monitored data) to the cyber security appliance 100 to determine what is occurring in each domain individually.

The security controls 210 are further configured and trained to understand that domain's information as well as correlate causal links between these activities in these domains to supply this input into the modules of the cyber security appliance 100. As an illustrative example, the OSINT monitoring engine 300 may receive content from the OSINT sources 295, processes the content, and generates the emerging threat landscape data 170 for routing to the cyber security appliance 100 via a publicly accessible network such as the Internet 280.

IV. OSINT Monitoring Engine

Referring to FIG. 3A, an exemplary embodiment of the OSINT monitoring engine 300 of FIG. 2 is shown. The OSINT monitoring engine 300 may be configured as an AI-driven system that continuously monitors content from OSINT sources 295 for emerging cyber threats, such as new critical vulnerabilities for example, and leverages in-depth knowledge of external attack surfaces associated with the enterprise 230 possessed by the cyber security appliance 100. According to one embodiment of the disclosure, the cyber security appliance 100, relying on AI model(s) 160 trained with machine learning on how to form cyber threat hypotheses, may generate a cyber threat hypothesis that features remediation suggestions for the emerging cyber threat or may rely on a cyber threat hypothesis (and remediation suggestions) for a known cyber threat with similar characteristics and perform the remediation suggestions associated with that cyber threat.

Herein, according to one embodiment of the disclosure, the OSINT monitoring engine 300 features a source evaluation module 310, one or more data stores 320, a content processing engine 330, and a content classification module 340. The OSINT monitoring engine 300 receives public content 305 from the OSINT sources 295, where the public content 305 may correspond to textual information or to information from which textual information can be extracted. Upon receipt of the public content 305, the source evaluation module 310 is configured to determine a confidence level associated with the OSINT source 295 that originated or distributed the public content 305. The public content 305 is not advanced to the content processing engine 330 unless the confidence level for the source of the public content 305 exceeds a prescribed threshold.

To verify a confidence level for the OSINT source 295 exceeds the prescribed threshold, the source evaluation module 310 relies on the operations of a data extraction component 312, a confidence level lookup component 313, a confidence generation component 314, and a threshold evaluation component 316. Herein, the data extraction component 312 is configured to obtain source data 318 associated with metrics used to determine the credibility of the source, such as (i) the characteristics of the OSINT source (e.g., social media platform, details surrounding the source such as characteristics-entity name, sender name, job title, number of followers/subscribers, etc.) from which the public content 305 was gathered, and/or (iii) the geographic location of the OSINT source.

Thereafter, the confidence lookup component 313 is configured to use at least a portion of the source data 318 as a lookup index and at least the same or different portion of the source data 318 may be used for comparison with known source data 322 maintained in the data store 320. The lookup and comparison are performed to determine whether the source (e.g., OSINT source and/or individual) has an assigned credibility level or not. As an illustrative example, the "credibility level" may be a static value set to a prescribed value based on the trustworthiness of the source and its accuracy in reporting cybersecurity information. The characteristics of the OSINT source and the source location may be metrics relied upon in setting the source's static value. Alternatively, the credibility level may be a dynamic value that can be adjusted based, at least in part, on the characteristics of the source, the source location, heuristics (e.g., verified accuracy of prior public content submissions directed to cybersecurity), and/or the presence of duplicative content from other OSINT sources and/or senders that collaborated or disagreed with submitted public content.

If the OSINT source has no prior assigned confidence level, an entry may be created within the data store 320 for that OSINT source and an initial confidence level would be assigned to that source based at least on gathered metrics associated with the source described above. The determination of the credibility level may involve an analysis of a single metric or multiple metrics (e.g., attributes, etc.), which are selected to provide insight in the credibility of the source, and thus, the potential accuracy of the received public content 305 before processing and dissemination is conducted. According to one embodiment of the disclosure, the source evaluation module 310 may take into account the multiple metrics such as the OSINT source characteristics and the geographic location of the OSINT source.

Herein, as shown in FIG. 3A, the data store 320 may operate as storage for confidence levels assigned to different monitored sources and storage for received public content 305 where the advancement of the received public content 305 to the content processing engine 330 is delayed until the source's confidence level exceeds a threshold or a collaborative cyber threat submission is received from a more credible source. As shown, both the source evaluation module 310 and the data store 320 may a port interface 311 and 321 to allow for administrator access. For instance, in lieu of public content 305, a cyber security analyst may manually update a content with cyber threat details via port interface 311 to the source evaluation module 310 for subsequent processing by the content processing engine 330. Additionally, via the port interface 321, the cyber security analyst may manually alter the contents of the data store 320 to influence processing or refrain from processing public content 305 from particular sources. For instance, the cyber security analyst may add entries with high confidence levels for credible, well-recognized leaders in the cybersecurity field, increasing confidence levels for credible sources, reducing confidence levels for other sources, adding cyber threat information to manually push the cyber threat for processing by the content processing engine 330, or the like.

Herein, the source evaluation module 310 may be configured to originally assign certain OSINT sources (e.g., government-sponsored platforms, credible news sources, etc.) with higher confidence levels than other OSINT sources that are focus more than "sensational" news. Similarly, the source evaluation module 310 may be configured to assign certain individuals (e.g., government officials, industry leaders, recognized cyber security professionals, etc.) with a higher confidence level than individuals unrecognized in the cybersecurity community or known to spread false rumors.

In the event that the source of the public content 305 is assigned a confidence level that exceeds a prescribed threshold, a textual segment 325 of the public content 305 is provided to the content processing engine (e.g., natural language processing "NLP" engine) 330 to identify textual, salient information 335 (e.g., words, phrases, etc.) that may be related to or useful in identifying an emerging cyber threat. The NLP engine 330 may be configured parse the textual segment 325 and extract the salient information 335 directed to the emerging cyber threat from the textual segment 325, where the salient information 335 may be used to classify the emerging cyber threat.

Herein, the content classification module 340 is configured to conduct a classification operation on the salient information 335 in order to identifying the particulars associated with the cyber threat, such as any or all of the following: potential threat type, a location of the cyber threat, a geographic location of the attack victim (e.g., attacked enterprise or computing device), the industry of the attack victim, the threat actor group associated with the cyber threat, targeted computing devices, and/or targeted software (e.g., type/version of operating system, etc.). Some or all of the salient information 335 may be included as part of the emerging threat landscape data 170 and provided to cyber security appliances and/or prediction engines associated with enterprises supported by the OSINT monitoring engine 300, provided the cyber threat is applicable to those enterprise (i.e., the appliance/engines are directed to enterprises vulnerable to the emerging cyber threat).

For instance, as an illustrative example, an emerging cyber threat directed to an enterprise involved in natural gas transport over pipelines based in the England would not be applicable to a clothing enterprise based in the United States. As a result, the OSINT monitoring engine 300 may refrain from providing the emerging threat landscape data 170 for this emerging cyber threat to cyber security appliance(s) protecting the clothing enterprise network. However, as the cyberthreat would be applicable to a pipeline services enterprise in another European country or perhaps certain US-based pipeline service enterprises (where that security administrators have opted to receive cyber threats in the same industry vertical), the OSINT monitoring engine 300 would provide the emerging threat landscape data 170 to cyber security appliance(s) protecting the European and US pipeline service enterprise networks.

Referring now to FIG. 3B, an exemplary embodiment of the internal architecture of the OSINT monitoring engine 300 of FIG. 3A is shown. Herein, the OSINT monitoring engine 300 includes a first (content) communication interface 350, a second (prediction engine) communication interface 355, and a third (appliance) communication interface 360, which are communicatively coupled to a cyber threat assessment engine 365. The cyber threat assessment engine 365 features the source evaluation module 310, the content processing engine 330, and the content classification module 340 as illustrated in FIG. 3A and discussed above. The cyber threat assessment engine 365 has access to the data store(s) 320, namely a confidence data store 370 and an enterprise data store 375.

Herein, the media evaluation data store 370 features a listing of current confidence levels 372 associated with media sources (e.g., social media platforms, organizations, individuals, etc.), where the confidence levels may be static or dynamic as adjusted (upward or downward) based on heuristics (e.g., verified accuracy of prior public content submissions) and/or collaborate or uncollaborative content. Also, the confidence data store 370 may be further configured to include portions 374 of received public content 305 from sources with confidence levels below a prescribed threshold, where the public content 305 may be "timed out" (overwritten) or forwarded to the content processing engine 330 in response to an event that elevates the confidence level associated with the source of the public content 372 (e.g., presence of new monitored public content that collaborates public content 372, hiring of a highly respected individual now operating as a facilitator for the OSINT source 295, etc.).

The enterprise data store 375 is configured to include information associated with each of the enterprises supported by the OSINT monitoring engine 300. The information may be utilized as training information for one or more AI models 3801-380N (where N≥1). The AI model(s) 380 are utilized by the content classification module 340 to generate the emerging threat landscape data 170, where the content of the emerging threat landscape data 170 may be uniform for all cyber security appliances or may differ depending on the type of cyber security appliance, the type of enterprise that the cyber security appliance is securing, or the like.

The OSINT monitoring engine 300 pre-shortens time from news headline to cyber security action. The OSINT monitoring engine 300 can be an AI-driven system that continuously monitors open-source intelligence sources for new critical vulnerabilities and assesses each organization's exposure through its in-depth knowledge of their unique external attack surface. The OSINT monitoring engine 300 cooperating with the prediction engine 700 can quickly assess which assets are potentially affected by the emerging critical vulnerability and can provide mitigation advice specific to the organization so that it stays protected.

New critical vulnerabilities, such as Log4J and ProxyLogon, make news headlines regularly and the average time to exploitation has shrunk to just fifteen days. Cyber security teams need to be able to quickly answer the question, "Are we vulnerable? And where?" Traditional vulnerability management programs are typically resource intensive, involving the constant monitoring of security news feeds and intelligence sources. Meanwhile, exposure tests from vulnerability scanners take time, leaving IT security teams exposed in the absence of a quick initial indicator of their unique exposure to the emerging threat.

The OSINT monitoring engine 300 uses AI to monitor threat feeds and OSINT sources for new critical vulnerabilities and publishes them on the dashboard of the prediction engine 700 and/or cyber security appliance 100 as part of the cyberthreat feed from the OSINT monitoring engine 300. The OSINT monitoring engine 300 cooperating with the prediction engine 700 shows a summary of the vulnerability, the affected software, and reveals how many assets have been found to run this software within the organization. The OSINT monitoring engine 300 cooperating with the prediction engine 700 and the cyber security appliance 100 augments the human security team by quickly determining whether an organization is affected by a new vulnerability, alleviating lengthy, labor-intensive manual processes. Traditionally, security teams had to take longer periods of time to work out whether they were affected when a vulnerability emerged, allowing a window for aggressive, fast-moving attackers to breach their organizations, often within hours.

The OSINT monitoring engine 300 cooperating with the prediction engine 700 can rapidly let the human security team know when a new vulnerability hits the headlines is, 'Whether their organization vulnerable? And if so, which assets are affected and how to protect them?' The OSINT monitoring engine 300 cooperating with the prediction engine 700 does this quickly and accurately. Against the backdrop of rapidly expanding attack surfaces and rising numbers of new, critical vulnerabilities, the OSINT monitoring engine 300 is a vital component in a security team's arsenal of proactive capabilities. When news of a vulnerability hits, security leaders need to know how it affects them specifically before their CISO, or the Board, demands answers. The OSINT monitoring engine 300 cooperating with the prediction engine 700 and the cyber security appliance 100 augments human capabilities by combining the intelligence of always-on, self-learning AI with the unique skills of human security teams. The OSINT monitoring engine 300 can be part of the prediction engine 700 family.

The OSINT monitoring engine 300 can provide critical insights on several emerging vulnerabilities such as:

An unauthenticated RCE vulnerability found in Citrix Gateway and Citrix ADC. This would allow attackers to remotely execute commands to place malware or other malicious code on a computer or network without any need for input from the victim.

RCE flaw, often used in shadow IT, found in CentOS Web Panel 7 Servers which allows attackers to execute malicious commands during the login process.

Unauthenticated remote code execution vulnerability affecting almost all Zoho ManageEngine products which is a blind spot for most organizations. In the worst-case scenario, attackers could use this vulnerability gain complete control of the system running the product, pivot to other systems in the organization, dump credentials and deploy ransomware.

Successful exploitation of any one of these vulnerabilities can lead to data breaches with accompanying large fines. The insights provided by the OSINT monitoring engine 300 could allow the security teams to understand, within an average of two and a half hours, if and where on their attack surface those vulnerabilities were likely to manifest. As a result, these organizations would be able to carry out timely mitigation actions and prevent any exploits.

In summary, the OSINT monitoring engine 300 supplies the emerging threat landscape data 170 to both the prediction engine 700 and the cyber security appliance 100 associated with the corresponding enterprise for adjusting control operability of the cyber threat analyst module 120, the assessment module 125 and/or the autonomous response module 140 and/or the enterprise resources as described in FIG. 1. Also, the OSINT monitoring engine 300 uses AI model(s) 380 to monitor public content from OSINT sources for emerging cyber threats (e.g., critical vulnerabilities), and when the cyber security appliance 100 is operating in tandem with the prediction engine 700, publishes information associated with the cyber threat on a dashboard as part of a feed from the cyber security appliance. The emerging threat landscape data 170 provides insights concerning the emerging cyber threat such as a summary of the threat (vulnerability), the affected software, and/or the resources identified running this software within the enterprise. The insights provided by the OSINT monitoring engine 300 allow a security administrator to understand, within an average of two and a half hours in lieu of days, if and where on their attack surface those vulnerabilities were likely to manifest. As a result, these enterprises are able to conduct timely mitigation actions and prevent a cybersecurity breach that can lead to large governmental fines and legal exposure.

V. Cyber Security Appliance Operability

A. Training of AI Pre Deployment and then During Deployment

In step 1, an initial training of the AI model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model, such as AI model(s) 160 and/or AI model(s) 380 for example (hereinafter "AI model(s) 160/380"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats.

In this example, one of the AI model(s) 160/380 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 100, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 160/380 may be trained on a normal behavior of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

A deployed AI model trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g., user account, device, etc.). Initial training of one or more of the AI models 160 of FIG. 1 trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of the AI model(s) 160 of FIG. 1 trained on a normal behavior of entities in the system can occur. Initial training of the AI model(s) 160 trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis.

During deployment, what is considered normal behavior will change as each different entity's behavior changes and will be reflected through the use of unsupervised learning in the model such as various Bayesian techniques, clustering, etc. The AI models 160/380 can be implemented with various mechanisms such neural networks, decision trees, etc. and combinations of these. Likewise, one or more supervised machine learning AI models 160/380 may be trained to create possible hypotheses and perform cyber threat investigations on agnostic examples of past historical incidents of detecting a multitude of possible types of cyber threat hypotheses previously analyzed by human cyber security analyst. More on the training of AI models 160/380 are trained to create one or more possible hypotheses and perform cyber threat investigations will be discussed later.

At its core, the self-learning AI models 160/180 that model the normal behavior (e.g. a normal pattern of life) of entities in the network mathematically characterizes what constitutes 'normal' behavior, based on the analysis of a large number of different measures of a device's network behavior-packet traffic and network activity/processes including server access, data volumes, timings of events, credential use, connection type, volume, and directionality of, for example, uploads/downloads into the network, file type, packet intention, admin activity, resource and information requests, command sent, etc.

B. Clustering Methods

In order to model what should be considered as normal for a device or cloud container, its behavior can be analyzed in the context of other similar entities on the network. The AI models (e.g., AI model(s) 160/380) can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber security analyst. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Next, the various AI models and AI classifiers combine use of unsupervised and supervised machine learning to learn 'on the job'—it does not depend upon solely knowledge of previous cyberattacks. The AI models and classifiers combine use of unsupervised and supervised machine learning constantly revises assumptions about behavior, using probabilistic mathematics, which is always up to date on what a current normal behavior is, and not solely reliant on human input. The AI models and classifiers combine use of unsupervised and supervised machine learning on cyber security is capable of seeing hitherto undiscovered cyber events, from a variety of threat sources, which would otherwise have gone unnoticed.

Next, these cyber threats can include, for example, Insider threat—malicious or accidental, Zero-day attacks—previously unseen, novel exploits, latent vulnerabilities, machine-speed attacks—ransomware and other automated attacks that propagate and/or mutate very quickly, Cloud and SaaS-based attacks, other silent and stealthy attacks advance persistent threats, advanced spear-phishing, etc.

C. Ranking the Cyber Threat

The assessment module 125 of FIG. 1 can cooperate with the AI model(s) 160 trained on possible cyber threats to use AI algorithms to account for ambiguities by distinguishing between the subtly differing levels of evidence that characterize network data. Instead of generating the simple binary outputs 'malicious' or 'benign', the AI's mathematical algorithms produce outputs marked with differing degrees of potential threat. This enables users of the system to rank alerts or notifications to the enterprise security administrator in a rigorous manner and prioritize those which most urgently require action. Meanwhile, it also assists to avoid the problem of numerous false positives associated with simply a rule-based approach.

As discussed in more detail above, the analyzer module 115 can cooperate with the one or more unsupervised AI (machine learning) model 160 trained on the normal pattern of life/normal behavior in order to perform anomaly detection against the actual normal pattern of life for that system to determine whether an anomaly (e.g., the identified abnormal behavior and/or suspicious activity) is malicious or benign. In the operation of the cyber security appliance 100, the emerging cyber threat can be previously unknown, but the emerging threat landscape data 170 representative of the emerging cyber threat shares enough (or does not share enough) in common with the traits from the AI models 160 trained on cyber threats to now be identified as malicious or benign. Note, if later confirmed as malicious, then the AI models 160 trained with machine learning on possible cyber threats can update their training. Likewise, as the cyber security appliance 100 continues to operate, then the one or more AI models trained on a normal pattern of life for each of the entities in the system can be updated and trained with unsupervised machine learning algorithms. The analyzer module 115 can use any number of data analysis processes (discussed more in detail below and including the agent analyzer data analysis process here) to help obtain system data points so that this data can be fed and compared to the one or more AI models trained on a normal pattern of life, as well as the one or more machine learning models trained on potential cyber threats, as well as create and store data points with the connection finger prints.

The AI model(s) 160/380 of FIGS. 1 and 3 can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

D. Anomaly Detection/Deviations

Anomaly detection can discover unusual data points in your dataset. Anomaly can be a synonym for the word 'outlier'. Anomaly detection (or outlier detection) is the identification of rare items, events or observations which raise suspicions by differing significantly from the majority of the data. Anomalous activities can be linked to some kind of problems or rare events. Since there are tons of ways to induce a particular cyberattack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day-to-day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two-level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given feature's values are non-anomalous, otherwise it's anomalous. Note, this anomaly detection can determine that a data point is anomalous/non-anomalous on the basis of a particular feature. In reality, the cyber security appliance 100 should not flag a data point as an anomaly based on a single feature. Merely, when a combination of all the probability values for all features for a given data point is calculated can the modules cooperating with the AI model of normal behavior can say with high confidence whether a data point is an anomaly or not.

Again, the AI models trained on a normal behavior of entities in a system (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, during pre-deployment the cyber threat analyst module 120 and the analyzer module 115 can use data analysis processes and cooperate with AI model(s) 160 trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyzer module 115 can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI model(s) 160/380 trained on a normal behavior of entities in a domain under analysis may perform the threat detection through a probabilistic change in a normal behavior through the application of, for example, an unsupervised Bayesian mathematical model to detect a behavioral change in computers and computer networks. The Bayesian probabilistic approach can determine periodicity in multiple time series data and identify changes across single and multiple time series data for the purpose of anomalous behavior detection. In an example, a system being protected can include both email and IT network domains under analysis. Thus, email and IT network raw sources of data can be examined along with a large number of derived metrics that each produce time series data for the given metric E. Additional Module Interactions Referring back to FIG. 1, the gather module 110 cooperates with the data store 135. The data store 135 stores comprehensive logs for network traffic observed. These logs can be filtered with complex logical queries and each IP packet can be interrogated on a vast number of metrics in the network information stored in the data store. Similarly, other domain's communications and data, such as emails, logs, etc. may be collected and stored in the data store 135. The gather module 110 may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gather module 110 for each possible hypothesis.

The data store 135 can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The gather module 110 may have a process identifier classifier. The process identifier classifier can identify and track each process and device in the network, under analysis, making communication connections. The data store 135 cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, data from any of the domains under analysis may be collected and compared.

Examples of domains/networks under analysis being protected can include any of i) an Informational Technology network, ii) an Operational Technology network, iii) a Cloud service, iv) a SaaS service, v) an endpoint device, vi) an email domain, and vii) any combinations of these. A domain module is constructed and coded to interact with and understand a specific domain.

For instance, the first domain module 145 may operate as an IT network module configured to receive information from and send information to, in this example, IT network-based sensors (i.e., probes, taps, etc.). The first domain module 145 also has algorithms and components configured to understand, in this example, IT network parameters, IT network protocols, IT network activity, and other IT network characteristics of the network under analysis. The second domain module 150 is, in this example, an email module. The second domain module 150 can be an email network module configured to receive information from and send information to, in this example, email-based sensors (i.e., probes, taps, etc.). The second domain module 150 also has algorithms and components configured to understand, in this example, email parameters, email protocols and formats, email activity, and other email characteristics of the network under analysis. Additional domain modules can also collect domain data from another respective domain.

The coordinator module 155 is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier (not shown) in the gather module 110 can cooperate with additional classifiers in each of the domain modules 145/150 to assist in tracking individual processes and associating them with entities in a domain under analysis as well as individual processes and how they relate to each other. The process identifier classifier can cooperate with other trained AI classifiers in the modules to supply useful metadata along with helping to make logical nexuses.

A feedback loop of cooperation exists between the gather module 110, the analyzer module 115, AI model(s) 160 trained on different aspects of this process, and the cyber threat analyst module 120 to gather information to determine whether a cyber threat is potentially attacking the networks/domains under analysis.

F. Determination of Whether Something is Likely Malicious

In the following examples the analyzer module 115 and/or cyber threat analyst module 120 can use multiple factors to the determination of whether a process, event, object, entity, etc. is likely malicious.

In an example, the analyzer module 115 and/or cyber threat analyst module 120 can cooperate with one or more of the AI model(s) 160 trained on certain cyber threats to detect whether the anomalous activity detected, such as suspicious email messages, exhibit traits that may suggest a malicious intent, such as phishing links, scam language, sent from suspicious domains, etc. The analyzer module 115 and/or cyber threat analyst module 120 can also cooperate with one of more of the AI model(s) 160 trained on potential IT based cyber threats to detect whether the anomalous activity detected, such as suspicious IT links, URLs, domains, user activity, etc., may suggest a malicious intent as indicated by the AI models trained on potential IT based cyber threats.

In the above example, the analyzer module 115 and/or the cyber threat analyst module 120 can cooperate with the one or more AI models 160 trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyzer module 115 and/or the cyber threat analyst module 120 can cooperate with the one or more AI models trained with machine learning on the normal pattern of life for entities in a second domain under analysis (in this example, an IT network) to detect, in this example, anomalous network activity by user and/or devices in the network, which is detected as outside of the usual pattern of life (e.g. abnormal) for each entity, such as a user or a device, of the second domain's network under analysis.

Thus, the analyzer module 115 and/or the cyber threat analyst module 120 can be configured with one or more data analysis processes to cooperate with the one or more of the AI model(s) 160 trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this cyber threat determination process, the analyzer module 115 and/or the cyber threat analyst module 120 can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models 160 trained on potential cyber threats and/or the AI classifiers looking at specific features for their malicious nature in order to make a determination of whether an individual factor and/or whether a chain of anomalies is determined to be likely malicious.

Initially, in this example of activity in an IT network analysis, the rare JA3 hash and/or rare user agent connections for this network coming from a new or unusual process are factored just like in the first wireless domain suspicious wireless signals are considered. These are quickly determined by referencing the one or more of the AI model(s) 160 trained with machine learning on the pattern of life of each device and its associated processes in the system. Next, the analyzer module 115 and/or the cyber threat analyst module 120 can have an external input to ingest threat intelligence from other devices in the network cooperating with the cyber security appliance 100. Next, the analyzer module 115 and/or the cyber threat analyst module 120 can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analysis module 115 and/or the cyber threat analyst module 120 can combine these Indicators of Compromise (e.g., unusual network JA3, unusual device JA3, . . . ) with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

Another example of features may include a deeper analysis of endpoint data. This endpoint data may include domain metadata, which can reveal peculiarities such as one or more indicators of potentially a malicious domain (i.e., its URL). The deeper analysis may assist in confirming an analysis to determine that indeed a cyber threat has been detected. The analysis module can also look at factors of how rare the endpoint connection is, how old the endpoint is, where geographically the endpoint is located, how a security certificate associated with a communication is verified only by an endpoint device or by an external 3rd party, just to name a few additional factors. The analysis module 115 (and similarly the cyber threat analyst module 120) can then assign weighting given to these factors in the machine learning that can be supervised based on how strongly that characteristic has been found to match up to actual malicious sites in the training.

In another AI classifier to find potentially malicious indicators, the agent analyzer data analysis process in the analyzer module 115 and/or cyber threat analyst module 120 may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client-server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The analyzer module 115 and/or the cyber threat analyst module 120 may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module 120 can use the agent analyzer data analysis process and the AI models(s) trained on forming and investigating hypotheses on what are a possible set of cyber threats to use the machine learning and/or set scripts to aid in forming one or more hypotheses to support or refute each hypothesis. The cyber threat analyst module 120 can cooperate with the AI models trained on forming and investigating hypotheses to form an initial set of possible hypotheses, which needs to be intelligently filtered down.

The cyber threat analyst module 120 can be configured to use the one or more supervised machine learning models trained on

- agnostic examples of a past history of detection of a multitude of possible types of cyber threat hypotheses previously analyzed by human, who was a cyber security professional,
- a behavior and input of how a plurality of human cyber security analysts make a decision and analyze a risk level regarding and a probability of a potential cyber threat,
- steps to take to conduct an investigation start with anomaly via learning how expert humans tackle investigations into specific real and synthesized cyber threats and then the steps taken by the human cyber security professional to narrow down and identify a potential cyber threat, and
- what type of data and metrics that were helpful to further support or refute each of the types of cyber threats, in order to determine a likelihood of whether the abnormal behavior and/or suspicious activity is either i) malicious or ii) benign?

The cyber threat analyst module 120 using AI models, scripts and/or rules based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

In an example, a behavioral pattern analysis for identifying what are the unusual behaviors of the network/system/device/user under analysis by the AI (machine learning) models may be as follows. The coordinator module 155 can tie the alerts, activities, and events from, in this example, the email domain to the alerts, activities, and events from the IT network domain. As shown in FIG. 4, a graph 410 of an embodiment of an example chain of unusual behavior for, in this example, the email activities as well as IT activities deviating from a normal pattern of life for this user and/or device in connection with the rest of the system/network under analysis. The cyber threat analysist module 120 and/or analyzer module 115 can cooperate with one or more AI (machine learning) models. The one or more AI (machine learning) models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behavior of a malicious actor—human, program, or other threat. The cyber threat analyst module 120 can go back and pull in some of the normal activities to help support or refute a possible hypothesis of whether that pattern is indicative of a behavior of a malicious actor.

An illustrative example of a behavioral pattern included in the chain is shown in the graph over a time frame of, an example, 7 days. The cyber threat analyst module 120 detects a chain of anomalous behavior of unusual data transfers three times, unusual characteristics in email messages in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three email messages with unusual characteristics. Again, the cyber security appliance 100 can go back and pull in some of the normal activities to help support or refute a possible hypothesis of whether that pattern is indicative of a behavior of a malicious actor. The analyzer module 115 of FIG. 1 can cooperate with one or more models trained on cyber threats and their behavior to try to determine if a potential cyber threat is causing these unusual behaviors. The cyber threat analyst module 120 can put data and entities into 1) a directed graph and nodes in that graph that are overlapping or close in distance have a good possibility of being related in some manner, 2) a vector diagram, 3) relational database, and 4) other relational techniques that will at least be examined to assist in creating the chain of related activity connected by causal links, such as similar time, similar entity and/or type of entity involved, similar activity, etc., under analysis. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviors under analysis, that are equal to or above a configurable level of threat posed by this malicious actor.

Referring still to FIG. 1, the autonomous response module 140 is configured to take one or more autonomous mitigation actions to mitigate the cyber threat during the cyberattack by the cyber threat. The autonomous response module 140 can reference an AI model trained to track a normal pattern of life for each node of the protected system to perform an autonomous act of, for example, restricting a potentially compromised node having i) an actual indication of compromise and/or ii) merely adjacent to a known compromised node, to merely take actions that are within that node's normal pattern of life to mitigate the cyber threat.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

G. Cyber Threat Assessment (Autonomous Actions)

In the next step, the analyzer module 115 and/or cyber threat analyst module 120 generates one or more supported possible cyber threat hypotheses from the possible set of cyber threat hypotheses. The analyzer module 115 generates the supporting data and details of why each individual hypothesis is supported or not. The analyzer module 115 can also generate one or more possible cyber threat hypotheses and the supporting data and details of why they were refuted.

In general, the analyzer module 115 cooperates with the following three sources. The analyzer module 115 cooperates with the one or more of the AI model(s) 160 trained on cyber threats to determine whether an anomaly such as the abnormal behavior and/or suspicious activity is either 1) malicious or 2) benign when the potential cyber threat under analysis is previously unknown to the cyber security appliance 100. The analyzer module 115 cooperates with one or more of the AI model(s) 160 trained on a normal behavior of entities in the network under analysis. The analyzer module 115 cooperates with various AI-trained classifiers. With all of these sources, when they input information that indicates a potential cyber threat that is i) severe enough to cause real harm to the network under analysis and/or ii) a close match to known cyber threats, then the analyzer module can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat.

In the next step, the assessment module 125 with the AI classifiers is configured to cooperate with the analyzer module 115. The analyzer module 115 supplies the identity of the supported possible cyber threat hypotheses from the possible set of cyber threat hypotheses to the assessment module 125. The assessment module 125 with the AI classifiers cooperates with the one or more of the AI model(s) 160 trained on possible cyber threats can make a determination on whether a cyber threat exists and what level of severity is associated with that cyber threat. The assessment module 125 with the AI classifiers cooperates with one or more of the AI model(s) 160 trained on possible cyber threats in order assign a numerical assessment of a given cyber threat hypothesis that was found likely to be supported by the analyzer module 115 with the one or more data analysis processes, via the abnormal behavior, the suspicious activity, or the collection of system data points. The assessment module 125 with the AI classifiers output can be a score (ranked number system, probability, etc.) that a given identified process is likely a malicious process.

The assessment module 125 with the AI classifiers can be configured to assign a numerical assessment, such as a probability, of a given cyber threat hypothesis that is supported and a threat level posed by that cyber threat hypothesis which was found likely to be supported by the analyzer module 115, which includes the abnormal behavior or suspicious activity as well as one or more of the collection of system data points, with the one or more AI models trained on possible cyber threats.

The cyber threat analyst module 120 in the AI-based cyber security appliance 100 component provides an advantage over competitors' products as it reduces the time taken for cyber security investigations, provides an alternative to manpower for small organizations and improves detection (and remediation) capabilities within the cyber security appliance 100.

The AI-based, cyber threat analyst module 120 performs its own computation of threat and identifies interesting network events with one or more processers. These methods of detection and identification of threat all add to the above capabilities that make the cyber threat analyst module 120 a desirable part of the cyber security appliance 100. The cyber threat analyst module 120 offers a method of prioritizing which is not just a summary or highest score alert of an event evaluated by itself equals the worst and prevents more complex attacks being missed because their composite parts/individual threats only produced low-level alerts.

The AI classifiers can be part of the assessment module 125, which scores the outputs of the analyzer module 115. Again, as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module 130 can generate an output such as a printed or electronic report with the relevant data. The formatting module 130 can cooperate with both the analyzer module 115 and the assessment module 125 depending on what the user wants to be reported.

The formatting module 130 is configured to format, present a rank for, and output one or more supported possible cyber threat hypotheses from the assessment module into a formalized report, from a one or more report templates populated with the data for that incident.

The formatting module 130 is configured to format, present a rank for, and output one or more detected cyber threats from the analyzer module or from the assessment module into a formalized report, from a one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine-readable format for further use in machine-learning reinforcement and refinement, or 4) any combination of the three.

The formatting module 130 is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat.

The formatting module 130 can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module 130 can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module 125 with the AI classifiers, once armed with the knowledge that malicious activity is likely occurring/is associated with a given process from the analyzer module 115, then cooperates with the autonomous response module 140 to take an autonomous action such as i) deny access in or out of the device or the network ii) shutdown activities involving a detected malicious agent, iii) restrict devices and/or user's to merely operate within their particular normal pattern of life, iv) remove some user privileges/permissions associated with the compromised user account, etc.

The autonomous response module 140, rather than a human taking an action, can be configured to cause one or more rapid autonomous actions in response to be taken to counter the cyber threat. A user interface for the response module can program the autonomous response module 140 i) to merely make a suggested response to take to counter the cyber threat that will be presented on a display screen and/or sent by a notice to an enterprise security administrator for explicit authorization when the cyber threat is detected or ii) to autonomously take a response to counter the cyber threat without a need for a human to approve the response when the cyber threat is detected. The autonomous response module 140 will then send a notice of the autonomous response as well as display the autonomous response taken on the display screen. Example autonomous responses may include cut off connections, shutdown devices, change the privileges of users, delete and remove malicious links in emails, slow down a transfer rate, cooperate with other security devices such as a firewall to trigger its autonomous actions, and other autonomous actions against the devices and/or users. The autonomous response module 140 uses one or more of the AI model(s) 160 that are configured to intelligently work with other third-party defense systems in that customer's network against threats. The autonomous response module 140 can send its own protocol commands to devices and/or take actions on its own. In addition, the autonomous response module 140 uses the one or more of the AI model(s) 160 to orchestrate with other third-party defense systems to create a unified defense response against a detected threat within or external to that customer's network. The autonomous response module 140 can be an autonomous self-learning digital response coordinator that is trained specifically to control and reconfigure the actions of traditional legacy computer defenses (e.g., firewalls, switches, proxy servers, etc.) to contain threats propagated by, or enabled by, networks and the internet. The cyber threat analyst module 120 can cooperate with the autonomous response module 140 to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The trigger module 105, analyzer module 115, assessment module 125, and formatting module 130 cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

VI. Prediction Engine and Restoration Engine

Overall, the cyber security appliance 100 and its modules use Artificial Intelligence algorithms configured and trained to perform a first machine-learned task of detecting the cyber threat as well as the autonomous response module 140 can use a combination of user configurable settings on actions to take to mitigate a detected cyber threat, a default set of actions to take to mitigate a detected cyber threat, and Artificial Intelligence algorithms configured and trained to perform a second machine-learned task of taking one or more mitigation actions to mitigate the cyber threat. A cyber security restoration engine 190 deployed in the cyber security appliance 100 uses Artificial Intelligence algorithms configured and trained to perform a third machine-learned task of remediating the system/network being protected back to a trusted operational state. The prediction engine 700 of FIG. 7 uses Artificial Intelligence algorithms configured and trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack.

Referring now to FIG. 7, an exemplary block diagram of embodiment of the AI-based cyber security system 702 implemented with the OSINT monitoring engine 300 and the prediction engine 700 is shown. The prediction engine 700 conducts Artificial Intelligence-based simulations by constructing a graph of nodes of the system being protected (e.g., a network including (a) the physical devices connecting to the network, any virtualized instances of the network, user accounts in the network, email accounts in the network, etc. as well as (b) connections and pathways through the network) to create a virtualized instance of the network to be tested. As shown in FIG. 7, the various cooperating modules residing in the prediction engine 700 may include, but are not limited to, a collections module 705, a cyberattack generator (e.g. phishing email generator) 710, an email module 715, a network module 720, an analyzer module 725, a payloads module 730 with first and second payloads, a communication module 735, a training module 740, a simulated attack module 750, a cleanup module 744, a scenario module 760, a user interface 765, a reporting module 770, a formatting module 775, an orchestration module 780, and/or an AI classifier 785 with a list of specified classifiers.

The simulated attack module 750 in the prediction engine 700 may be implemented via i) a simulator to model the system being protected and/or ii) a clone creator to spin up a virtual network and create a virtual clone of the system being protected configured to pen-test one or more defenses provided by the cyber security appliance 100. The prediction engine 700 may include and cooperate with one or more AI models 787 trained with machine learning on the contextual knowledge of the organization, such as those in the cyber security appliance 100 or have its own separate model trained with machine learning on the contextual knowledge of the organization and each user's and device's normal pattern of behavior. These trained AI models 787 may be configured to identify data points from the contextual knowledge of the organization and its entities, which may include, but is not limited to, language-based data, email/network connectivity and behavior pattern data, and/or historic knowledgebase data. The prediction engine 700 may use the trained AI models 787 to cooperate with one or more AI classifier(s) 785 by producing a list of specific organization-based classifiers for the AI classifier(s) 785.

The simulated attack module 750 by cooperating with the other modules in the prediction engine 700 is further configured to calculate and run one or more hypothetical simulations of a possible cyberattack and/or of an actual ongoing cyberattack from a cyber threat through an attack pathway through the system being protected. The prediction engine 700 is further configured to calculate, based at least in part on the results of the one or more hypothetical simulations of a possible cyberattack and/or of an actual ongoing cyberattack from a cyber threat through an attack pathway through the system being protected, a risk score for each node (e.g. each device, user account, etc.), the threat risk score being indicative of a possible severity of the compromise and/or chance of compromise prior to an autonomous response action is taken in response to an actual cyberattack of the cyber incident.

The simulated attack module 750 is configured to initially create the network being protected in a simulated or virtual device environment. Additionally, the orchestration module 780 and communications module 735 may be configured to cooperate with the cyber security appliance 100 to securely obtain specific data about specific users, devices, and entities in specific networks of for this specific organization. The training module 740 and simulated attack module 750 in the prediction engine 700 use the obtained specific data to generate one or more specific cyberattacks, such as a phishing email, tailored to those specific users, devices, and/or entities of the specific organization. Many different cyberattacks can be simulated by the AI red team module but a phishing email attack will be used as an example cyberattack.

The prediction engine 700 is communicatively coupled to the cyber security appliance 100, an open source (OS) database server 790, an email system 791 with one or more endpoint computing devices 791A-B, and a network system 792 with one or more entities 793-799, and a restoration engine 745 over one or more networks 746/747. The cyber security appliance 100 may cooperate with the prediction engine 700 to initiate a pen-test in the form of, for example, a software attack, which generates a customized, for example, phishing email to spoof one or more specific users/devices/entities of an organization in an email/network defense system and then looks for any security vulnerabilities, risks, threats, and/or weaknesses potentially gaining access to one or more features and data of that specific user/device/entity.

The prediction engine 700 may be customized and/or driven by a centralized AI using and/or modelling a smart awareness of a variety of specific historical email/network behavior patterns and communications of a specific organization's hierarchy within a specific organization. Such AI modelling may be trained and derived through machine learning and the understanding of the organization itself based on: (i) a variety of OS materials such as any OS materials collected from the OS database server 790 and (ii) its historical awareness of any specific email/network connectivity and behavior patterns to target for that organization as part of an offensive (or attacking) security approach. The training module 740 can contain for reference a database of cyberattack scenarios as well as restoration response scenarios by the restoration engine 745 stored in the database.

The prediction engine 700 may use the orchestration module 780 to implement and orchestrate this offensive approach all the way from an initial social engineering attack at an earlier stage of the pentest to a subsequent payload delivery attack at a later stage of the pentest and so on. The prediction engine 700 is configured to: (i) intelligently initiate a customized cyberattack on the components, for example, in the IT network and email system 791; as well as (ii) subsequently generating a report to highlight and/or raise awareness of one or more key areas of vulnerabilities and/or risks for that organization after observing the intelligently initiated attack (e.g., such key areas may be formatted and reported in a way tailored for that organization using both the formatting and reporting modules, as described below); and (iii) then allow that enterprise (e.g., organization) to be trained on that attack and its impact on those specific security postures, thereby allowing that organization to go in directly to mitigate and improve those compromised security postures going forward, as well as iv) during an actual cyberattack, obtain and ingest data known on the cyberattack, run simulations, and then supply information, for example, to the autonomous response module in the cyber security appliance to mitigate the actual cyberattack.

The prediction engine 700 may cooperate with the cyber security appliance 100 to provide feedback on any successful attacks and detections. For example, in the event that the prediction engine 700 is successful in pentesting any of the organization's entities in the email and network defense systems 791/792, the prediction engine 700 may be configured to at least provide the cyber security appliance 100 (and/or any other predetermined entities) with any feedback on the successful pentest as well as any specifics regarding the processes uses for that successful pentest, such as providing feedback on the specific attack vectors, scenarios, targeted entities, characteristics of the customized phishing emails, payloads, and contextual data, etc., that were used.

The simulated attack module 750 in the prediction engine 700 may be configured with an attack path modeling component (not shown), which is programmed to work out the key paths and devices in a network via running cyberattacks on a simulated or virtual device version of the network under analysis incorporating metrics that feed into that modeling by running simulated cyberattacks on the particulars known about this specific network being protected by the cyber security appliance 100. The attack modeling has been programmed with the knowledge of a layout and connection pattern of each particular network device in a network and a number of connections and/or hops to other network devices in the network. Also, how important a particular device (a key importance) can be determined by the function of that network device, the user(s) associated with that network device, the location of the device within the network and a number of connections and/or hops to other important devices in the network. The attack path modeling component ingests the information for the purposes of modeling and simulating a potential attack against the network and routes that an attacker would take through the network. The attack path modeling component can be constructed with information to i) understand an importance of network nodes in the network compared to other network nodes in the network, and ii) to determine key pathways within the network and vulnerable network nodes in the network that a cyberattack would use during the cyberattack, via modeling the cyberattack on at least one of 1) a simulated device version and 2) a virtual device version of the network under analysis.

FIG. 7 illustrates a diagram of an embodiment of the cyber security appliance and its Artificial Intelligence-based simulations constructing an example graph of nodes in an example network and simulating how the cyberattack might likely progress in the future tailored with an innate understanding of a normal behavior of the nodes in the system being protected and a current operational state of each node in the graph of the protected system during simulations of cyberattacks. The prediction engine 700 plots the attack path through the nodes and estimated times to reach critical nodes in the network. The cyberattack simulation modeling is run to identify the routes, difficulty, and time periods from certain entry notes to certain key servers.

The attack path modeling component in the simulated attack module 750 cooperating with the other modules in the prediction engine 700 are configured to determine the key pathways within the network and the vulnerable network nodes in the network that the cyberattack would use during the cyberattack, via the modeling of the cyberattack on at least one of 1) the simulated device version and 2) the virtual device version of the network under analysis via using the actual detected vulnerabilities of each network node, a predicted frequency of remediation of those vulnerabilities within a specific network device in the network without a notice from the restoration engine 745, and an importance of the key network nodes with the actual vulnerabilities compared to other network nodes in the network.

The modules essentially seed the attack path modeling component with weakness scores that provide current data, customized to each user account and/or network device, which then allows the artificial intelligence running the attack path simulation to choose entry network nodes into the network with more accuracy as well as plot the attack path through the nodes and estimated times to reach critical nodes in the network much more accurately based on the actual current operational condition of the many user accounts and network devices in the network. The attack simulation modeling can be run to identify the routes, difficulty, and time periods from certain entry notes to certain key servers.

Note, the cyber threat analyst module 120 in the cyber security appliance 100 of FIG. 1 as well as the prediction engine 700 of FIG. 7 may use any unusual, detected behavior deviating from the normal behavior and then build a sequence/chain of unusual behavior and the causal links between the sequence/chain of unusual behavior to detect any potential cyber threats. For example, as shown in FIG. 4, the cyber security appliance 100 and the prediction engine 700 may determine the unusual patterns by analyzing i) what activities/events/alerts that fall outside of the window of what is the normal pattern of life for that network/system/entity/device/user under analysis; and (ii) then pulling in and analyzing the pattern of the behavior of the activities/events/alerts that are in the normal pattern of life but also connect to the indictors for a possible cyberattack, to determine whether that pattern is indicative of a behavior of a malicious actor, such as a human, program, and/or any other cyber harmful threat.

The prediction engine 700 and its Artificial Intelligence-based simulations use artificial intelligence to cooperate with the restoration engine 745 to assist in choosing one or more remediation actions to perform on nodes affected by the cyberattack back to a trusted operational state while still mitigating the cyber threat during an ongoing cyberattack based on effects determined through the simulation of possible remediation actions to perform and their effects on the nodes making up the system being protected and preempt possible escalations of the cyberattack while restoring one or more nodes back to a trusted operational state. Thus, for example, the restoration engine 745 restores the one or more nodes in the protected system by cooperating with any of 1) an AI model trained to model a normal pattern of life for each node in the protected system, 2) an AI model trained on what are a possible set of cyber threats and their characteristics and symptoms to identify the cyber threat (e.g. malicious actor/device/file) that is causing a particular node to behave abnormally (e.g. malicious behavior) and fall outside of that node's normal pattern of life, and 3) the autonomous response module 140.

The restoration engine 745 can reference both i) a database of restoration response scenarios stored in the database and ii) a prediction engine 700 configured to run AI-based simulations and use the operational state of each node in the graph of the protected system during simulations of cyberattacks on the protected system to restore 1) each node compromised by the cyber threat and 2) promote protection of the corresponding nodes adjacent to a compromised node in the graph of the protected system.

The restoration engine 745 can prioritize among the one or more nodes to restore, which nodes to remediate and an order of the nodes to remediate, based on two or more factors including i) a dependency order needed for the recovery efforts, ii) an importance of a particular recovered node compared to other nodes in the system being protected, iii) a level of compromise of a particular node contemplated to be restored, iv) an urgency to recover that node compared to whether containment of the cyber threat was successful, v) a list of a most important things in the protected system to recover earliest, and vi) factoring in a result of a cyberattack simulation being run during the cyberattack by the prediction engine 700 to predict a likely result regarding the cyberattack when that node is restored.

An interactive response loop exists between the restoration engine 745, the cyber security appliance 100, and the prediction engine 700. The restoration engine 745, the cyber security appliance 100, and the prediction engine 700 can be configured to cooperate to combine an understanding of normal operations of the nodes making up the devices and users in the system being protected by the cyber security appliance 100, an understanding emerging cyber threats, an ability to contain those emerging cyber threats, and a restoration of the nodes of the system to heal the system with an adaptive feedback between the multiple AI-based engines in light of simulations of the cyberattack to predict what might occur in the nodes in the system based on the progression of the attack so far, mitigation actions taken to contain those emerging cyber threats and remediation actions taken to heal the nodes using the simulated cyberattack information. The multiple AI-based engines have communication hooks in between them to exchange a significant amount of behavioral metrics including data between the multiple AI-based engines to work in together to provide an overall cyber threat response.

The cyber security appliance 100 and its modules use Artificial Intelligence algorithms configured and trained to perform a first machine-learned task of detecting the cyber threat as well as the autonomous response module 140 can use a combination of user configurable settings on actions to take to mitigate a detected cyber threat, a default set of actions to take to mitigate a detected cyber threat, and Artificial Intelligence algorithms configured and trained to perform a second machine-learned task of taking one or more mitigation actions to mitigate the cyber threat.

The restoration engine 745 uses Artificial Intelligence algorithms configured and trained to perform a third machine-learned task of remediating the system/network being protected back to a trusted operational state. The prediction engine 700 uses Artificial Intelligence algorithms configured and trained to perform a fourth machine-learned task of AI-based simulations of cyberattacks to assist in determining 1) how a simulated cyberattack might occur in the system being protected, and 2) how to use the simulated cyberattack information to preempt possible escalations of an ongoing actual cyberattack.

In an example, the autonomous response module 140 uses its intelligence to cooperate with the prediction engine 700 and its AI-based simulations to choose and initiate an initial set of one or more mitigation actions indicated as a preferred targeted initial response to the detected cyber threat by autonomously initiating those mitigation actions to defend against the detected cyber threat, rather than a human taking an action.

Referring to FIG. 5, an exemplary and generalized embodiment of a system (e.g., enterprise network) 50 featuring computer systems 10 and 40, where one or more of these computer systems 10 and/or 40 may deploy the AI-based, cyber security appliance 100 of FIG. 1 to protect the enterprise, is shown. Herein, the system 50 comprises a first computer system 10 within a building, which uses the threat detection system to detect and thereby attempt to prevent threats to computing devices within its bounds.

The first computer system 10 comprises three computing devices 1, 2, 3, a local server 4, and a multifunctional device (MFD) 5 that provides printing, scanning and facsimile functionalities to each of the computers 1, 2, 3. All of the devices within the first computer system 10 are communicatively coupled via a first Local Area Network (LAN) 6. Consequently, all of the computing devices 1, 2, 3 are able to access the local server 4 via the first LAN 6 and use the functionalities of the MFD 5 via the LAN 6.

The first LAN 6 of the first computer system 10 is connected to the Internet 20, which in turn provides computing devices 1, 2, 3 with access to a multitude of other computing devices, including a server 30 and a second computer system 40. The second computer system 40 also includes two computing devices 41, 42, connected by a second LAN 43.

In this exemplary embodiment of the cyber security appliance 100, a first computing device 1 on the first computer system 10 has the electronic hardware, modules, models, and various software processes of the cyber security appliance 100; and therefore, runs threat detection for detecting threats to the first computer system 10. As such, the first computing device 1 includes one or more processors arranged to run the steps of the process described herein, memory storage components required to store information related to the running of the process, as well as one or more network interfaces for collecting information from various security controls (e.g., sensors, probes, etc.) collecting data associated with the system (network) 50 under analysis.

The cyber security appliance 100 in the first computing device 1 builds and maintains a dynamic, ever-changing model of the 'normal behavior' of each user and machine within the first computer system 10. The approach is based on Bayesian mathematics, and monitors all interactions, events and communications within the first computer system 10—which computing device is talking to which, files that have been created, networks that are being accessed.

For example, a second computing device 2 is based in a company's San Francisco office and operated by a marketing employee who regularly accesses the marketing network, usually communicates with machines in the company's U.K. office in the second computer system 40 between 9.30 AM and midday, and is active from about 8:30 AM until 6 PM.

The same employee virtually never accesses the employee time sheets, very rarely connects to the company's Atlanta network and has no dealings in South-East Asia. The cyber security appliance 100 takes all the information that is available relating to this employee and establishes a 'pattern of life' for that person and the devices used by that person in that system, which is dynamically updated as more information is gathered. The model of the normal pattern of life for an entity in the system 50 under analysis is used as a moving benchmark, allowing the cyber security appliance 100 to spot behavior on the system 50 seems to fall outside of this normal pattern of life, and flags this behavior as anomalous, requiring further investigation and/or autonomous action.

The cyber security appliance 100 is built to deal with the fact that today's attackers are getting stealthier, and an attacker/malicious agent may be 'hiding' in a system to ensure that they avoid raising suspicion in an end user, such as by slowing their machine down.

The AI model(s) (not shown) in the cyber security appliance 100 builds a sophisticated 'pattern of life'—that understands what represents normality for every person, device, and network activity in the system being protected by the cyber security appliance 100.

The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The detection engine self-learning AI can learn "on the job" from real-world data occurring in the system and constantly evolves its understanding as the system's environment changes. The Artificial Intelligence can use machine learning algorithms to analyze patterns and 'learn' what is the 'normal behavior' of the system (network) 50 by analyzing data on the activity on the system 50 at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised learning can break down features of what it is analyzing (e.g., a network node of a device or user account), which can be useful for categorization, and then identify what else has similar or overlapping feature sets matching to what it is analyzing.

The cyber security appliance 100 can use unsupervised machine learning to works things out without pre-defined labels. In the case of sorting a series of different entities, such as animals, the system analyzes the information and works out the different classes of animals. This allows the system 50 to handle the unexpected and embrace uncertainty when new entities and classes are examined. The modules and models of the cyber security appliance 100 do not always know what they are looking for but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network-even when it does not know what it is looking for.

The cyber security appliance 100 can use a Recursive Bayesian Estimation to combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter. Using RBE, the cyber security appliance 100's AI models are able to constantly adapt themselves, in a computationally efficient manner, as new information becomes available to the system. The AI model(s) of the cyber security appliance 100 may be configured to continually recalculate threat levels in the light of new evidence, identifying changing attack behaviors where conventional signature-based methods fall down.

Training an AI model can be accomplished by having the model learn good values for all of the weights and the bias for labeled examples created by the system, and in this case; starting with no labels initially. A goal of the training of the AI model can be to find a set of weights and biases that have low loss, on average, across all examples.

The AI classifier can receive supervised machine learning with a labeled data set to learn to perform their task as discussed herein. An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The AI model representing normal behavior from a given normal training data set can detect anomalies by establishing the normal pattern and then test the likelihood of a test instance under analysis to be generated by the AI model. Anomaly detection can identify rare items, events or observations which raise suspicions by differing significantly from the majority of the data, which includes rare objects as well as things like unexpected bursts in activity.

The methods and systems shown in the Figures and discussed in the text herein can be coded to be performed, at least in part, by one or more processing components with any portions of software stored in an executable format on a computer readable medium. Thus, any portions of the method, apparatus and system implemented as software can be stored in one or more non-transitory storage medium in an executable format to be executed by one or more processors.

The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

VII. Computing Devices

Figure 6:
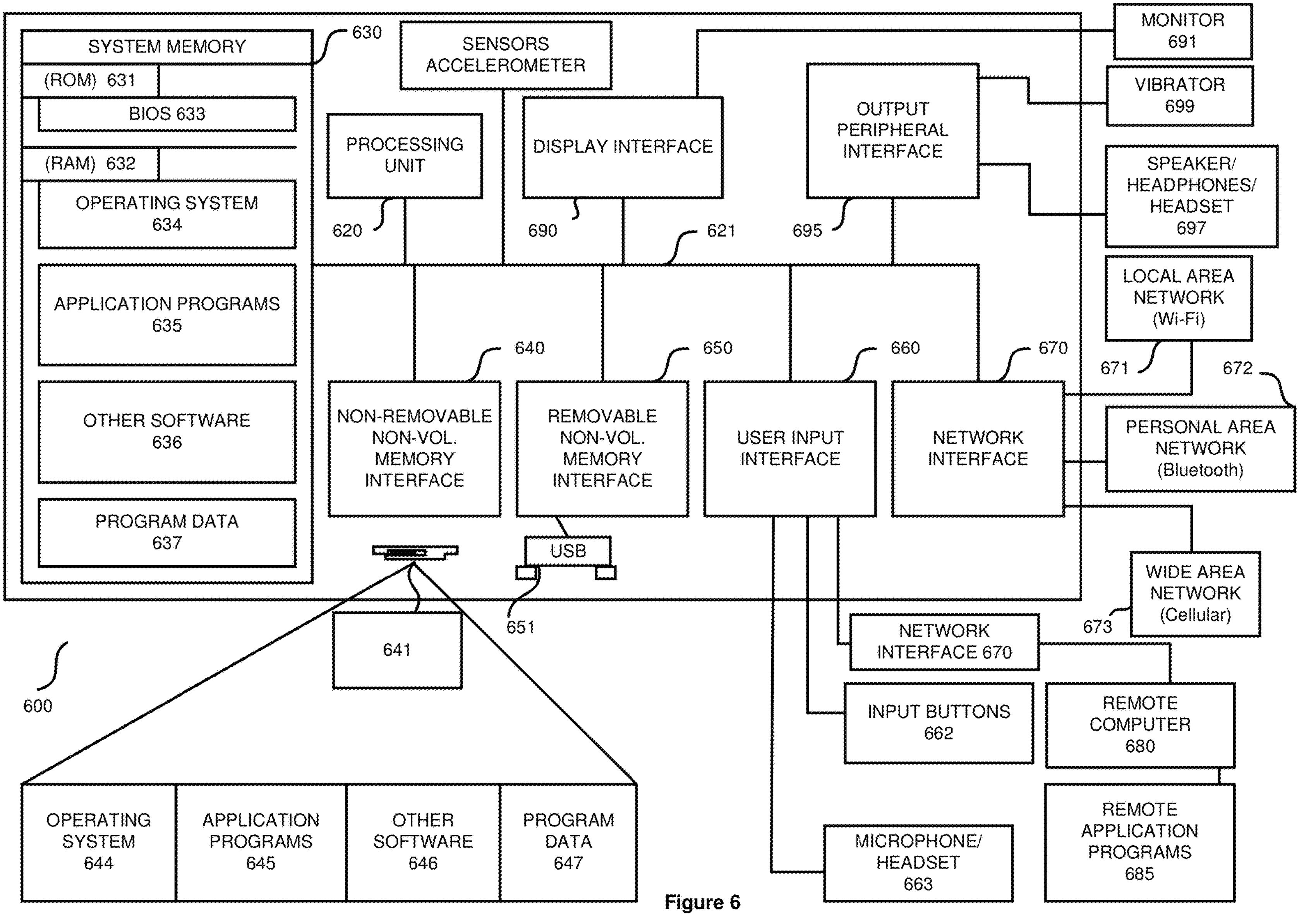
FIG. 6 illustrates a block diagram of an embodiment of one or more computing devices that can be a part of the AI-based cyber security system for an embodiment of the current design discussed herein.

FIG. 6 illustrates a block diagram of an embodiment of one or more computing devices that can be a part of an AI-based, cyber security system for an embodiment of the current design discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software.

In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. A module is a core component of a complex system consisting of hardware and/or software that is capable of performing its function discretely from other portions of the entire complex system but designed to interact with the other portions of the entire complex system. Note, many functions performed by electronic hardware components can be duplicated by software emulation. Thus, a software program written to accomplish those same functions can emulate the functionality of the hardware components in the electronic circuitry.

Unless specifically stated otherwise as apparent from the above discussions, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system’s registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An open-source intelligence (OSINT) monitoring engine for monitoring incoming content received from a source for emerging cyber threats to protect one or more enterprise networks, the OSINT monitoring engine comprising:

a source evaluation module configured to determine that, when executed by one or more processors, determines a confidence level associated with a source of the incoming content based on at least characteristics of the source and a geographic location of the source, wherein the characteristics of the source comprises a social media platform from which the incoming content is received and details surrounding the source including a name of an entity on the social media platform and wherein the source evaluation module refrains from providing textual information associated with the incoming content unless the confidence level associated with the source is equal to or exceeds a prescribed threshold;

a content processing engine configured to process that, when executed by one or more processors, processes the textual information, when the confidence level associated with the source is equal to or exceeds the prescribed threshold, to identify salient information for use in identifying an emerging cyber threat of the emerging cyber threats; and a content classification module configured to receive the salient information and classify the salient information to identify characteristics associated with the emerging cyber threat, wherein the OSINT monitoring engine is configured to provide emerging threat landscape data including at least a portion of the salient information to a cyber security appliance associated with the one or more enterprise networks that is vulnerable to the emerging cyber threat to adjust operability of one or more modules of the cyber security appliance and to a prediction engine configured to conduct simulations on operability of the enterprise network if exploited by the emerging cyber threat and provide information to further adjust functionality of the cyber security appliance within the one or more enterprise networks, and wherein the source evaluation module, the content processing engine and the content classification module are implemented with i) electronic circuits, ii) as software stored in one or more non-transitory computer storage mediums and executed by one or more processors, and iii) any combination of i) or ii).

2. The OSINT monitoring engine of claim 1, wherein the details surrounding the source further comprise a number of followers or subscribers associated with the entity.

3. The OSINT monitoring engine of claim 1, wherein the content processing engine is configured to perform natural programming language (NLP) operations on the textual information by at least parsing the textual information and identifying the salient information.

4. The OSINT monitoring engine of claim 1 being communicatively coupled to the source corresponding to an open-source intelligence source.

5. The OSINT monitoring engine of claim 4, wherein the open-source intelligence source includes a public media source that provides public accessibility to the incoming content.

6. The OSINT monitoring engine of claim 1 further comprising a first communication interface operating as an input port for receiving the incoming content.

7. The OSINT monitoring engine of claim 6 further comprising a second communication interface operating at least as an output port communicatively coupled to the cyber security appliance, wherein the one or more modules of the cyber security appliance operate with one or more artificial intelligence (AI) models to (i) identify, from the emerging threat landscape data including at least a portion of the salient information, whether the emerging cyber threat is an actual exploit and (ii) autonomously adjust, without human intervention, functionality of the cyber security appliance including at least weighting factors, thresholds or metrics utilized by a module of the one or more modules of the cyber security appliance to mitigate or prevent effects caused to the enterprise network by the emerging cyber threat.

8. The OSINT monitoring engine of claim 7 further comprising a third communication interface operating at least as an output port communicatively coupled to a prediction engine, wherein the prediction engine is configured to further adjust functionality of a resource within the enterprise network.

9. A non-transitory storage medium including software for monitoring incoming content received from a source for emerging cyber threats to protect one or more enterprise networks, the software comprising:

a source evaluation module configured to determine a confidence level associated with a source of the incoming content based on at least characteristics of the source and a geographic location of the source, wherein (i) the characteristics of the source comprises a social media platform from which the incoming content is received and details surrounding the source including a name of an entity on the social media platform, and (ii) the source evaluation module refrains from providing textual information associated with the incoming content unless the confidence level associated with the source is equal to or exceeds a prescribed threshold;

a content processing engine configured to process the textual information, when the confidence level associated with the source is equal to or exceeds the prescribed threshold, to identify salient information for use in identifying an emerging cyber threat; and a content classification module configured to receive the salient information and classify the salient information to identify characteristics associated with the emerging cyber threat, wherein the software, when executed by one or more processors, is configured to provide emerging threat landscape data including at least a portion of the salient information to a cyber security appliance associated with the one or more enterprise networks that is vulnerable to the emerging cyber threat to adjust operability of one or more modules of the cyber security appliance and to a prediction engine configured to conduct simulations on operability of the enterprise network if exploited by the emerging cyber threat and provide information to further adjust functionality of the cyber security appliance or a resource within the one or more enterprise networks.

10. The non-transitory storage medium of claim 9, wherein the details surrounding the source further comprise a number of followers or subscribers associated with the entity.

11. The non-transitory storage medium of claim 9, wherein the content processing engine is configured to perform natural programming language (NLP) operations on the textual information by at least parsing the textual information and identifying the salient information.

12. The non-transitory storage medium of claim 9 including software being communicatively coupled to the source corresponding to an open-source intelligence source.

13. The non-transitory storage medium of claim 12, wherein the open-source intelligence source includes a public media source that provides public accessibility to the incoming content.

14. The non-transitory storage medium of claim 9, wherein the software further comprises a first communication interface operating as an input port for receiving the incoming content.

15. The non-transitory storage medium of claim 14, wherein the software further comprises a second communication interface operating at least as an output port communicatively coupled to the cyber security appliance, wherein one or more modules of the cyber security appliance operate with one or more artificial intelligence (AI) models to (i) identify, from the emerging threat landscape data including at least a portion of the salient information, whether the emerging cyber threat is an actual exploit and (ii) autonomously adjust, without human intervention, functionality of the cyber security appliance including at least weighting factors, thresholds or metrics utilized by a module of the one or more modules of the cyber security appliance or a resource within an enterprise network of the one or more enterprise networks to mitigate or prevent effects caused to the enterprise network by the emerging cyber threat.

16. The non-transitory storage medium of claim 15, wherein the software further comprises a third communication interface operating at least as an output port communicatively coupled to a prediction engine, wherein the prediction engine is configured to (i) conduct simulations on operability of the enterprise network if exploited by the emerging cyber threat and (ii) provide information to the cyber security appliance to further adjust functionality of both the cyber security appliance and the resource within the enterprise network.

17. A computerized method for monitoring incoming content received from a source for emerging cyber threats to protect one or more enterprise networks, the method comprising:

determining a confidence level associated with a source of the incoming content based on at least characteristics of the source and a geographic location of the source, wherein the characteristics of the source comprises a social media platform from which the incoming content is received and details surrounding the source including a name of an entity on the social media platform;

refraining from providing textual information associated with the incoming content to a content processing engine unless the confidence level associated with the source is equal to or exceeds a prescribed threshold;

processing, by the content processing engine, the textual information when the confidence level associated with the source is equal to or exceeds the prescribed threshold in order to identify salient information for use in identifying an emerging cyber threat; and receiving, by a content classification module, the salient information;

classifying the salient information to identify characteristics associated with the emerging cyber threat; and providing emerging threat landscape data including at least a portion of the salient information to a cyber security appliance associated with the one or more enterprise networks that is vulnerable to the emerging cyber threat to adjust operability of one or more modules of the cyber security appliance and to a prediction engine configured to conduct simulations on operability of the enterprise network if exploited by the emerging cyber threat and provide information to further adjust functionality of the cyber security appliance or a resource within the one or more enterprise networks.

18. The computerized method of claim 17, wherein the details surrounding the source further comprise a number of followers or subscribers associated with the entity.

19. The computerized method of claim 17, wherein the processing of the textual information comprises performing natural programming language (NLP) operations on the textual information by at least parsing the textual information and identifying the salient information.

20. The computerized method of claim 17, wherein prior to determining the confidence level, the computerized method further comprises receiving the incoming content from the source corresponding to an open-source intelligence source.

* * * * *